(12) United States Patent
Du et al.

(10) Patent No.: US 10,878,833 B2
(45) Date of Patent: Dec. 29, 2020

(54) SPEECH PROCESSING METHOD AND TERMINAL

(71) Applicant: Huawei Technologies Co., Ltd., Shenzhen (CN)

(72) Inventors: Yanbin Du, Hangzhou (CN); Zhihai Zhu, Shenzhen (CN); Meng Liao, Hangzhou (CN); Weijun Zheng, Shenzhen (CN); Weibin Chen, Hangzhou (CN); Guangzhao Bao, Shanghai (CN); Cunshou Qiu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 162 days.

(21) Appl. No.: 16/158,993

(22) Filed: Oct. 12, 2018

(65) Prior Publication Data

US 2019/0115039 A1 Apr. 18, 2019

(30) Foreign Application Priority Data

Oct. 13, 2017 (CN) .......................... 2017 1 0954340

(51) Int. Cl.
*G10L 21/0364* (2013.01)
*G10L 25/78* (2013.01)
(Continued)

(52) U.S. Cl.
CPC .......... *G10L 21/0364* (2013.01); *G10L 17/26* (2013.01); *G10L 21/0216* (2013.01);
(Continued)

(58) Field of Classification Search
None
See application file for complete search history.

(56) References Cited

U.S. PATENT DOCUMENTS

| 5,459,814 A * | 10/1995 | Gupta | ............... G10L 25/78 |
| | | | 704/214 |
| 7,809,555 B2 * | 10/2010 | Kim | ............... G10L 25/93 |
| | | | 704/208 |

(Continued)

FOREIGN PATENT DOCUMENTS

| CN | 101192405 A | 6/2008 |
| CN | 102197424 A | 9/2011 |

(Continued)

OTHER PUBLICATIONS

Sharifzadeh et al, "Reconstruction of Normal Sounding Speech for Laryngectomy Patients Through a Modified CELP Codec," IEEE Transactions on Biomedical Engineering, vol. 57, No. 10, pp. 2448-2458, XP011327030, Institute of Electrical and Electronics Engineers—New York, New York (Oct. 2010).

(Continued)

*Primary Examiner* — Thuykhanh Le
(74) *Attorney, Agent, or Firm* — Leydig, Voit & Mayer, Ltd.

(57) ABSTRACT

A speech processing method and a terminal are provided. The method includes: receiving signals from a plurality of microphones; performing, by using a same sampling rate, analog-to-digital conversion on the plurality of paths of signals received from the plurality of microphones, to obtain a plurality of paths of time-domain digital signals; performing time-to-frequency-domain conversion on the plurality of paths of time-domain digital signals to obtain a plurality of paths of frequency-domain signals; and determining a signal type of the primary frequency-domain signal based on at least one of a sound pressure difference between the primary frequency-domain signal and each of N paths of secondary frequency-domain signals in the M paths of secondary frequency-domain signals, a phase difference between the primary frequency-domain signal and each of the N paths of (Continued)

secondary frequency-domain signals, and a frequency distribution characteristic of the primary frequency-domain signal.

24 Claims, 5 Drawing Sheets

(51) Int. Cl.
| | |
|---|---|
| *G10L 17/26* | (2013.01) |
| *G10L 21/0216* | (2013.01) |
| *H04R 1/22* | (2006.01) |
| *G10L 21/0208* | (2013.01) |
| *G10L 25/90* | (2013.01) |
| *G10L 25/18* | (2013.01) |
| *H04R 3/04* | (2006.01) |
| *H04R 3/00* | (2006.01) |

(52) U.S. Cl.
CPC .............. *G10L 25/78* (2013.01); *H04R 1/222* (2013.01); *G10L 21/0208* (2013.01); *G10L 25/18* (2013.01); *G10L 25/90* (2013.01); *G10L 2021/02087* (2013.01); *G10L 2021/02165* (2013.01); *G10L 2021/02166* (2013.01); *H04R 3/005* (2013.01); *H04R 3/04* (2013.01); *H04R 2430/03* (2013.01); *H04R 2499/11* (2013.01)

(56) References Cited

U.S. PATENT DOCUMENTS

| | | | |
|---|---|---|---|
| 8,270,634 B2* | 9/2012 | Harney | H04R 1/245 381/94.5 |
| 9,640,194 B1 | 5/2017 | Nemala | G10L 21/0232 |
| 9,830,899 B1* | 11/2017 | Every | G10L 21/0316 |
| 2003/0097256 A1* | 5/2003 | Kleijn | G10L 21/0364 704/207 |
| 2006/0085183 A1 | 4/2006 | Jain | |
| 2006/0167691 A1* | 7/2006 | Tuli | G10L 21/0364 704/258 |
| 2008/0133225 A1* | 6/2008 | Yamada | G10L 15/1807 704/207 |
| 2009/0326952 A1* | 12/2009 | Toda | G10L 21/0364 704/270 |
| 2010/0131268 A1* | 5/2010 | Moeller | G10L 21/0364 704/233 |
| 2011/0038489 A1* | 2/2011 | Visser | G01S 3/8006 381/92 |
| 2011/0125491 A1* | 5/2011 | Alves | G10L 21/0364 704/207 |
| 2011/0264447 A1* | 10/2011 | Visser | G10L 25/78 704/208 |
| 2012/0058803 A1* | 3/2012 | Nicholson | H04M 1/605 455/570 |
| 2012/0123771 A1* | 5/2012 | Chen | H04R 1/245 704/226 |
| 2012/0150544 A1* | 6/2012 | McLoughlin | G10L 21/0364 704/262 |
| 2013/0272540 A1* | 10/2013 | hgren | H04R 3/00 381/94.1 |
| 2014/0072134 A1* | 3/2014 | Po | G10K 11/178 381/71.11 |
| 2014/0072135 A1* | 3/2014 | Bajic | G10K 11/002 381/71.11 |
| 2014/0192999 A1* | 7/2014 | Sannino | G01S 3/8083 381/92 |
| 2015/0317994 A1* | 11/2015 | Ramadas | G10L 19/24 704/226 |
| 2015/0381132 A1* | 12/2015 | Hayashi | A63H 3/28 381/107 |
| 2016/0019886 A1* | 1/2016 | Hong | G10L 15/24 704/231 |
| 2016/0314781 A1* | 10/2016 | Schultz | A61B 5/04886 |
| 2016/0360372 A1 | 12/2016 | Chen et al. | |
| 2016/0379638 A1* | 12/2016 | Basye | G10L 15/18 704/235 |
| 2017/0243602 A1* | 8/2017 | Yang | G10L 21/0264 |
| 2017/0318387 A1* | 11/2017 | Ray | H04R 3/005 |
| 2017/0358301 A1* | 12/2017 | Raitio | G10L 13/033 |
| 2018/0041639 A1* | 2/2018 | Gunawan | G10L 21/02 |
| 2018/0122361 A1* | 5/2018 | Silveira Ocampo | G10L 13/033 |
| 2018/0166090 A1* | 6/2018 | Tu | G10L 21/038 |
| 2018/0349093 A1* | 12/2018 | McCarty | H04L 12/282 |
| 2019/0253795 A1* | 8/2019 | Ozcan | H04R 1/04 |

FOREIGN PATENT DOCUMENTS

| | | |
|---|---|---|
| CN | 106023986 A | 10/2016 |
| GB | 2456296 A | 7/2009 |

OTHER PUBLICATIONS

Hayre, "Deep Sea Diver Speech Distortion—A Chemical-Stress Effect?" University of Houston Houston, Texas 77004, XP031632765, pp. 348-352, IEEE, Institute of Electrical and Electronics Engineers—New York, New York (Sep. 1979).

Mathur et al, "Significance of the LP-MVDR spectral ratio method in Whisper Detection", IEEE, pp. 1-5, XP031983107, IEEE, Institute of Electrical and Electronics Engineers—New York, New York (2011).

Meenakshi et al, "Robust Whisper Activity Detection Using Long-Term Log Energy Variation of Sub-Band Signal", IEEE Signal Processing Letters, vol. 22, XP011584134, pp. 1859-1863, Institute of Electrical and Electronics Engineers—New York, New York (Nov. 2015).

* cited by examiner

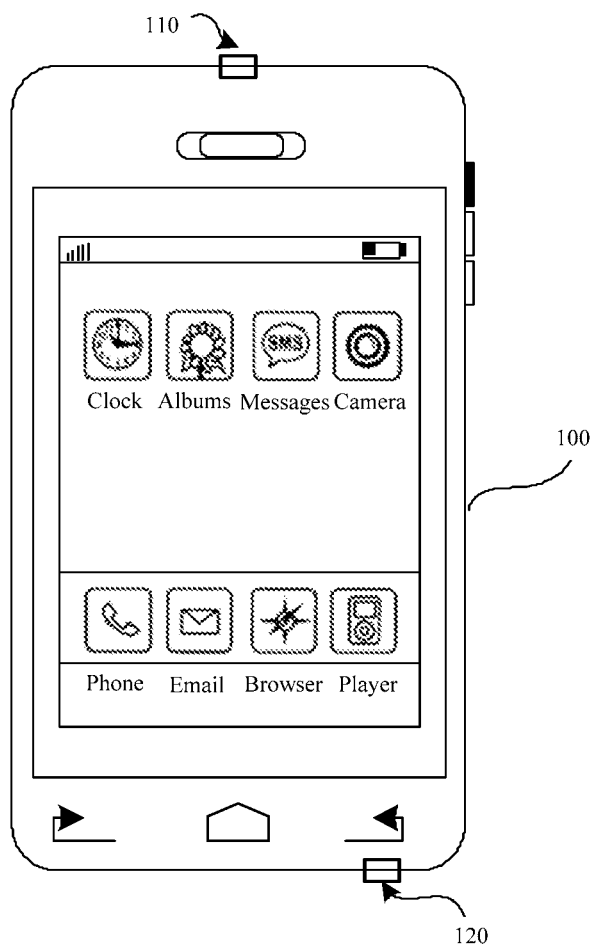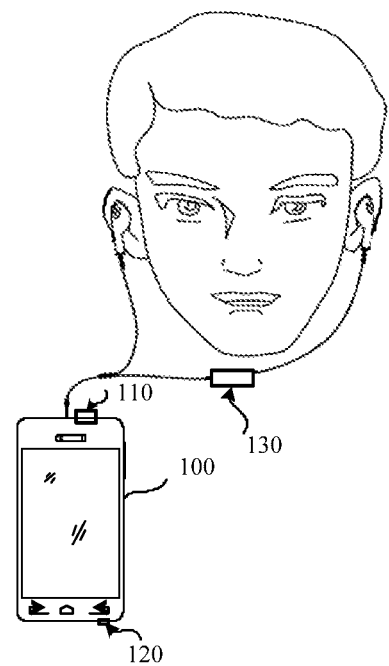
FIG. 1
FIG. 2

SPEECH PROCESSING METHOD AND TERMINAL

CROSS-REFERENCE TO RELATED APPLICATION

This application claims priority to Chinese Patent Application No. 201710954340.1, filed on Oct. 13, 2017, which is hereby incorporated by reference in its entirety.

TECHNICAL FIELD

This application relates to the speech processing field, and more specifically, to a speech processing method and a terminal.

BACKGROUND

Currently, mobile phones have become main calling devices, and during a call using mobile phones, handheld calling is a most widely applied calling manner. In some particular scenarios, there may be other persons alongside a calling party. To avoid disturbing the other persons, it is inconvenient for the calling party to speak loudly, and the calling party usually speaks in a low voice deliberately, and even speaks by whispering (usually known as a private conversation). During a call, various disturbing noise sources usually exist, such as echoes, reverberation, and environmental noise. A target speech needs to be separated from a disturbing sound by using a speech enhancement technology. Therefore, a target speech segment needs to be detected. However, because a vocal cord of a person does not vibrate during whispering, a speech feature is quite different from that of a normal speech. In addition, all current speech detection manners are for a voiced speech with harmonics, and cannot distinguish between a whisper speech and a disturbing sound.

Therefore, how to detect a whisper speech or a whisper signal becomes a problem urgently to be resolved.

SUMMARY

This application provides a speech processing method and a terminal, so as to identify a whisper signal without increasing device costs, enhancing user experience during a whisper call.

According to a first aspect, a speech processing method is provided. The method may be applied to a terminal. The method includes: receiving signals from a plurality of microphones, where the plurality of microphones include a primary microphone and M secondary microphones, $M \geq 1$, and M is an integer; performing, by using a same sampling rate, analog-to-digital conversion on the plurality of paths of signals received from the plurality of microphones, to obtain a plurality of paths of time-domain digital signals; performing time-to-frequency-domain conversion on the plurality of paths of time-domain digital signals to obtain a plurality of paths of frequency-domain signals, where the plurality of paths of frequency-domain signals include one path of primary frequency-domain signal and M paths of secondary frequency-domain signals, the primary frequency-domain signal corresponds to the primary microphone, and the M paths of secondary frequency-domain signals are in a one-to-one correspondence with the M secondary microphones; and determining a signal type of the primary frequency-domain signal based on at least one of a sound pressure difference between the primary frequency-domain signal and each of N paths of secondary frequency-domain signals in the M paths of secondary frequency-domain signals, a phase difference between the primary frequency-domain signal and each of the N paths of secondary frequency-domain signals, and a frequency distribution characteristic of the primary frequency-domain signal, where $1 \leq N \leq M$, and N is an integer.

Optionally, the signal type includes a whisper signal. The whisper signal may also be referred to as a whisper speech. Determining the signal type of the primary frequency-domain signal is determining the primary frequency-domain signal, that is, whether the signal received from the primary microphone is the whisper signal.

Optionally, when the N paths of secondary frequency-domain signals are some of the M paths of secondary frequency-domain signals, the N paths of secondary frequency-domain signals may be selected according to the following rules:

selecting, from the M paths of secondary frequency-domain signals, N paths of signals having maximum energy as the N paths of secondary frequency-domain signals; or selecting, from the M paths of secondary frequency-domain signals, N paths of signals whose corresponding secondary microphones are closest to the primary microphone as the N paths of secondary frequency-domain signals; or randomly selecting, from the M paths of secondary frequency-domain signals, N paths of signals as the N paths of secondary frequency-domain signals.

It should be understood that, a manner of selecting the N paths of secondary frequency-domain signals from the M paths of secondary frequency-domain signals is not limited in this application.

Therefore, according to the speech processing method in this embodiment of this application, whether the primary frequency-domain signal is a whisper signal may be determined based on at least one of the sound pressure difference between the primary frequency-domain signal and each of the N paths of secondary frequency-domain signals in the M paths of secondary frequency-domain signals, the phase difference between the primary frequency-domain signal and each of the N paths of secondary frequency-domain signals, and the frequency distribution characteristic of the primary frequency-domain signal. Because the method in this embodiment of this application does not depend on sensor information, the whisper signal can be identified without increasing device costs, thereby providing a basis for subsequent speech processing, and enhancing user experience during a whisper call.

In a possible implementation, the signal type includes the whisper signal. The determining a signal type of the primary frequency-domain signal based on at least one of a sound pressure difference between the primary frequency-domain signal and each of N paths of secondary frequency-domain signals in the M paths of secondary frequency-domain signals, a phase difference between the primary frequency-domain signal and each of the N paths of secondary frequency-domain signals, and a frequency distribution characteristic of the primary frequency-domain signal includes:

determining the primary frequency-domain signal as a whisper signal when at least one of the following conditions is satisfied:

the sound pressure difference between the primary frequency-domain signal and each of the N paths of secondary frequency-domain signals is greater than or equal to a corresponding first threshold and is less than a corresponding second threshold, where each of the N paths of secondary frequency-domain signals corresponds to one first threshold and one second threshold;

the phase difference between the primary frequency-domain signal and each of the N paths of secondary frequency-domain signals is greater than or equal to a corresponding third threshold and is less than a corresponding fourth threshold, where each of the N paths of secondary frequency-domain signals corresponds to one third threshold and one fourth threshold; and the primary frequency-domain signal satisfies at least one of the following conditions: there is no fundamental frequency; a harmonic quantity is less than or equal to a fifth threshold; and a sub-band having maximum sub-band energy belongs to a first frequency band, and a difference between normalized energy of each of at least three sub-bands included in the primary frequency-domain signal and normalized energy of a corresponding sub-band in at least three sub-bands included in a predefined whisper signal is less than a corresponding sixth threshold, where the at least three sub-bands included in the primary frequency-domain signal are in a one-to-one correspondence with the at least three sub-bands included in the predefined whisper signal, each of the at least three sub-bands included in the primary frequency-domain signal corresponds to one sixth threshold, the normalized energy of each sub-band is a ratio of energy of the sub-band to total energy of the at least three sub-bands, and the energy of the sub-band is a sum of energy of frequency ranges in the sub-band.

Therefore, whether the primary frequency-domain signal is a whisper signal may be determined by determining whether the primary frequency-domain signal satisfies one or more of the foregoing conditions.

Optionally, a sound pressure difference between the primary frequency-domain signal and a path of secondary frequency-domain signal may be represented by an amplitude difference between the primary frequency-domain signal and the path of the secondary frequency-domain signal or an amplitude ratio of the primary frequency-domain signal to the path of the secondary frequency-domain signal.

Optionally, a phase difference between the primary frequency-domain signal and a path of secondary frequency-domain signal may be represented by a phase difference between the primary frequency-domain signal and the path of the secondary frequency-domain signal or a phase ratio of the primary frequency-domain signal to the path of the secondary frequency-domain signal.

Optionally, the frequency distribution characteristic of the primary frequency-domain signal may be represented by using whether the primary frequency-domain signal has a fundamental frequency, a harmonic quantity, and normalized energy of each sub-band.

It should be understood that, the foregoing described first threshold, second threshold, third threshold, and fourth threshold each may be determined based on a location of a corresponding microphone. A specific manner of determining the foregoing thresholds is not limited in this application.

In a possible implementation, the signal type includes the whisper signal. The determining a signal type of the primary frequency-domain signal based on at least one of a sound pressure difference between the primary frequency-domain signal and each of N paths of secondary frequency-domain signals in the M paths of secondary frequency-domain signals, a phase difference between the primary frequency-domain signal and each of the N paths of secondary frequency-domain signals, and a frequency distribution characteristic of the primary frequency-domain signal includes:

determining the primary frequency-domain signal as a whisper signal when the following conditions are satisfied:

the sound pressure difference between the primary frequency-domain signal and each of the N paths of secondary frequency-domain signals is greater than or equal to a corresponding seventh threshold, where each of the N paths of secondary frequency-domain signals corresponds to one seventh threshold;

the phase difference between the primary frequency-domain signal and each of the N paths of secondary frequency-domain signals is greater than or equal to a corresponding eighth threshold, where each of the N paths of secondary frequency-domain signals corresponds to one eighth threshold; and the primary frequency-domain signal satisfies at least one of the following conditions: there is no fundamental frequency; a harmonic quantity is less than or equal to a fifth threshold; and a sub-band having maximum sub-band energy belongs to a first frequency band, and a difference between normalized energy of each of at least three sub-bands included in the primary frequency-domain signal and normalized energy of a corresponding sub-band in at least three sub-bands included in a predefined whisper signal is less than a corresponding sixth threshold, where the at least three sub-bands included in the primary frequency-domain signal are in a one-to-one correspondence with the at least three sub-bands included in the predefined whisper signal, each of the at least three sub-bands included in the primary frequency-domain signal corresponds to one sixth threshold, the normalized energy of each sub-band is a ratio of energy of the sub-band to total energy of the at least three sub-bands, and the energy of the sub-band is a sum of energy of frequency ranges in the sub-band.

Therefore, whether the primary frequency-domain signal is a whisper signal may be determined by determining whether the primary frequency-domain signal satisfies one or more of the foregoing conditions.

It should be understood that, the foregoing described seventh threshold and eighth threshold each may be determined based on a location of a corresponding microphone. A specific manner of determining the seventh threshold and the eighth threshold is not limited in this application.

In a possible implementation, when the primary frequency-domain signal is determined as a whisper signal, the method may further include:

performing at least one of stationary noise estimation, background human noise estimation, and burst noise estimation on the primary frequency-domain signal; and performing noise reduction processing on estimated noise.

In a possible implementation, the performing background human noise estimation on the primary frequency-domain signal includes:

performing background human noise estimation on the primary frequency-domain signal by using an adaptive beamformer whose beam width is a first width, where the first width is less than a preset beam width.

The preset beam width is a beam width of the adaptive beamformer when background human noise estimation is performed on a normal speech (or a normal speech signal). The first width may be adaptively adjusted or may be predefined. This is not limited in embodiments of this present application. Variance The adaptive beamformer may use a minimum variance distortionless response (MVDR) method or another method. This is not limited in this embodiment of this application.

Noise reduction effectiveness can be improved by using the adaptive beamformer whose beam width is less than the preset beam width.

In a possible implementation, the performing burst noise estimation on the primary frequency-domain signal includes:

collecting statistics about a change speed of a primary frequency-domain signal in a first time window by using the first time window whose time window length is less than a preset length;

determining, when the change speed of the signal is greater than a preset speed threshold, whether normalized energy of each sub-band of the primary frequency-domain signal in the first time window is greater than or equal to a corresponding ninth threshold, and whether normalized energy of all sub-bands of the primary frequency-domain signal in the first time window is diminished in ascending order of frequencies, where the primary frequency-domain signal in the first time window includes at least one sub-band, the normalized energy of each sub-band is a ratio of energy of the sub-band to total energy of the at least one sub-band, and the energy of the sub-band is a sum of energy of frequency ranges in the sub-band; and determining the signal in the first time window as burst noise when the normalized energy of each sub-band of the primary frequency-domain signal in the first time window is greater than or equal to the corresponding ninth threshold and the normalized energy of all the sub-bands of the primary frequency-domain signal in the first time window is diminished in ascending order of frequencies.

In a possible implementation, the method may further include:

performing gain control on a signal obtained after the noise reduction, to obtain a gain-adjusted signal.

According to speech processing method in this embodiment of this application, a noise reduction policy for background human noise and the burst noise is adjusted with reference to a characteristic of a whisper call scenario, and intelligibility of the whisper speech can be enhanced by improving noise reduction effectiveness and accuracy for the background human noise and the burst noise.

In a possible implementation, when gain control is performed on the signal obtained after the noise reduction, at least one of the following conditions is satisfied:

a gain lower limit is a target lower limit, a gain upper limit is a target upper limit, a maximum level value of the signal obtained after the noise reduction is a target level value, and a gain smoothing speed is a target speed.

The target lower limit is greater than a preset lower limit, the target upper limit is less than a preset upper limit, the target level value is less than a preset level value, and the target speed is less than a preset speed.

It should be noted that, the preset lower limit, the preset upper limit, the preset level value, and the preset speed respectively correspond to corresponding parameters existing when gain control is performed on the normal speech.

According to the speech processing method in this embodiment of this application, a gain processing policy is adjusted with reference to a characteristic of the whisper call scenario, and a volume and smoothness of the whisper speech can be improved by properly increasing the volume, reducing a target level threshold, and slowing the gain smoothing speed.

In a possible implementation, the method may further include:

performing frequency response control on the gain-adjusted signal, to obtain a frequency-response-adjusted signal.

In a possible implementation, the performing frequency response control on the gain-adjusted signal includes:

performing frequency response control on a first frequency band of the gain-adjusted signal by using a first target frequency response, performing frequency response control on a second frequency band of the gain-adjusted signal by using a second target frequency response, and performing frequency response control on a third frequency band of the gain-adjusted signal by using a third target frequency response.

The first target frequency response is greater than a first preset frequency response, the second target frequency response is greater than a second preset frequency response, the third target frequency response is less than a third preset frequency response, and a minimum frequency in the first frequency band is greater than or equal to a maximum frequency in the second frequency band and is less than or equal to a minimum frequency in the third frequency band. That is, the first frequency band is a middle frequency band, the second frequency band is a low frequency band, and the third frequency band is a high frequency band. For example, the low frequency band may be 0 to 500 Hz, the middle frequency band may be 500 Hz to 2000 Hz, and the high frequency band may be a frequency band higher than 2000 Hz.

It should be noted that, the first preset frequency response, the second preset frequency response, and the third preset frequency response respectively correspond to frequency responses existing when frequency response control is performed on a middle frequency band, a low frequency band, and a high frequency band in the normal speech.

According to the method in this embodiment of this application, a frequency response processing policy is adjusted with reference to a characteristic of the whisper call scenario, and sound quality of the whisper speech can be improved by emphasizing correction of low and high frequency responses.

According to a second aspect, a speech processing method is provided. The method may be applied to a terminal. The method includes: receiving signals from a plurality of microphones, where the plurality of microphones include a primary microphone and M secondary microphones, M≥1, and M is an integer;

performing, by using a same sampling rate, analog-to-digital conversion on the plurality of paths of signals received from the plurality of microphones, to obtain a plurality of paths of time-domain digital signals;

performing time-to-frequency-domain conversion on the plurality of paths of time-domain digital signals to obtain a plurality of paths of frequency-domain signals, where the plurality of paths of frequency-domain signals include one path of primary frequency-domain signal and M paths of secondary frequency-domain signals, the primary frequency-domain signal corresponds to the primary microphone, and the M paths of secondary frequency-domain signals are in a one-to-one correspondence with the M secondary microphones; and determining a signal type of the primary frequency-domain signal based on at least one of a sound pressure difference between the primary frequency-domain signal and each of N paths of secondary frequency-domain signals in the M paths of secondary frequency-domain signals and a frequency distribution characteristic of the primary frequency-domain signal, where $1 \leq N \leq M$, and N is an integer.

Therefore, according to the speech processing method in this embodiment of this application, whether the primary frequency-domain signal is a whisper signal may be determined based on at least one of the sound pressure difference between the primary frequency-domain signal and each of the N paths of secondary frequency-domain signals in the M paths of secondary frequency-domain signals and the frequency distribution characteristic of the primary frequency-domain signal. Because the method in this embodiment of this application does not depend on sensor information, a whisper speech can be identified without increasing device costs, thereby providing a basis for subsequent speech processing, and enhancing user experience during a whisper call.

In a possible implementation, the signal type includes a whisper signal.

The determining a signal type of the primary frequency-domain signal based on at least one of a sound pressure difference between the primary frequency-domain signal and each of N paths of secondary frequency-domain signals in the M paths of secondary frequency-domain signals and a frequency distribution characteristic of the primary frequency-domain signal includes:

when the sound pressure difference between the primary frequency-domain signal and each of the N paths of secondary frequency-domain signals is greater than or equal to a corresponding first threshold and is less than a corresponding second threshold, where each of the N paths of secondary frequency-domain signals corresponds to one first threshold and one second threshold; and when the primary frequency-domain signal satisfies at least one of the following conditions: there is no fundamental frequency; a harmonic quantity is less than or equal to a fifth threshold; and a sub-band having maximum sub-band energy belongs to a first frequency band, and a difference between normalized energy of each of at least three sub-bands included in the primary frequency-domain signal and normalized energy of a corresponding sub-band in at least three sub-bands included in a predefined whisper signal is less than a corresponding sixth threshold, determining the primary frequency-domain signal as a whisper signal.

The at least three sub-bands included in the primary frequency-domain signal are in a one-to-one correspondence with the at least three sub-bands included in the predefined whisper signal, each of the at least three sub-bands included in the primary frequency-domain signal corresponds to one sixth threshold, the normalized energy of each sub-band is a ratio of energy of the sub-band to total energy of the at least three sub-bands, and the energy of the sub-band is a sum of energy of frequency ranges in the sub-band In a possible implementation, the signal type includes a whisper signal.

The determining a signal type of the primary frequency-domain signal based on at least one of a sound pressure difference between the primary frequency-domain signal and each of N paths of secondary frequency-domain signals in the M paths of secondary frequency-domain signals and a frequency distribution characteristic of the primary frequency-domain signal includes:

when the sound pressure difference between the primary frequency-domain signal and each of the N paths of secondary frequency-domain signals is greater than or equal to a corresponding seventh threshold, where each of the N paths of secondary frequency-domain signals corresponds to one seventh threshold; and when the primary frequency-domain signal satisfies at least one of the following conditions: there is no fundamental frequency; a harmonic quantity is less than or equal to a fifth threshold; and a sub-band having maximum sub-band energy belongs to a first frequency band, and a difference between normalized energy of each of at least three sub-bands included in the primary frequency-domain signal and normalized energy of a corresponding sub-band in at least three sub-bands included in a predefined whisper signal is less than a corresponding sixth threshold, determining the primary frequency-domain signal as a whisper signal.

The at least three sub-bands included in the primary frequency-domain signal are in a one-to-one correspondence with the at least three sub-bands included in the predefined whisper signal, each of the at least three sub-bands included in the primary frequency-domain signal corresponds to one sixth threshold, the normalized energy of each sub-band is a ratio of energy of the sub-band to total energy of the at least three sub-bands, and the energy of the sub-band is a sum of energy of frequency ranges in the sub-band In a possible implementation, when the primary frequency-domain signal is determined as a whisper signal, the method further includes:

performing at least one of stationary noise estimation, background human noise estimation, and burst noise estimation on the primary frequency-domain signal; and performing noise reduction processing on estimated noise.

In a possible implementation, the performing background human noise estimation on the primary frequency-domain signal includes:

performing background human noise estimation on the primary frequency-domain signal by using an adaptive beamformer whose beam width is a first width, where the first width is less than a preset beam width.

In a possible implementation, the performing burst noise estimation on the primary frequency-domain signal includes:

collecting statistics about a change speed of a primary frequency-domain signal in a first time window by using the first time window whose time window length is less than a preset length;

determining, when the change speed of the signal is greater than a preset speed threshold, whether normalized energy of each sub-band of the primary frequency-domain signal in the first time window is greater than or equal to a corresponding ninth threshold, and whether normalized energy of all sub-bands of the primary frequency-domain signal in the first time window is diminished in ascending order of frequencies, where the primary frequency-domain signal in the first time window includes at least one sub-band, the normalized energy of each sub-band is a ratio of energy of the sub-band to total energy of the at least one sub-band, and the energy of the sub-band is a sum of energy of frequency ranges in the sub-band; and determining the signal in the first time window as burst noise when the normalized energy of each sub-band of the primary frequency-domain signal in the first time window is greater than or equal to the corresponding ninth threshold and the normalized energy of all the sub-bands of the primary frequency-domain signal in the first time window is diminished in ascending order of frequencies.

In a possible implementation, the method further includes:

performing gain control on a signal obtained after the noise reduction, to obtain a gain-adjusted signal.

In a possible implementation, when gain control is performed on the signal obtained after the noise reduction, at least one of the following conditions is satisfied:

a gain lower limit is a target lower limit, a gain upper limit is a target upper limit, a maximum level value of the signal obtained after the noise reduction is a target level value, and a gain smoothing speed is a target speed.

The target lower limit is greater than a preset lower limit, the target upper limit is less than a preset upper limit, the target level value is less than a preset level value, and the target speed is less than a preset speed.

In a possible implementation, the method further includes:

performing frequency response control on the gain-adjusted signal, to obtain a frequency-response-adjusted signal.

In a possible implementation, the performing frequency response control on the gain-adjusted signal includes:

performing frequency response control on a first frequency band of the gain-adjusted signal by using a first target frequency response, performing frequency response control on a second frequency band of the gain-adjusted signal by using a second target frequency response, and performing frequency response control on a third frequency band of the gain-adjusted signal by using a third target frequency response, where the first target frequency response is greater than a first preset frequency response, the second target frequency response is greater than a second preset frequency response, the third target frequency response is less than a third preset frequency response, and a minimum frequency in the first frequency band is greater than or equal to a maximum frequency in the second frequency band and is less than or equal to a minimum frequency in the third frequency band.

It should be understood that, the speech processing method provided in the second aspect can achieve beneficial effects corresponding to those in the speech processing method provided in the first aspect. For brevity, details are not described herein again. In addition, some optional embodiments of the speech processing method provided in the first aspect may also be applied to the speech processing method provided in the second aspect. For brevity, the embodiments are not enumerated in detail herein.

According to a third aspect, a terminal is provided. The terminal is configured to perform the method according to the first aspect or any possible implementation of the first aspect. Specifically, the terminal includes a unit configured to perform the method according to the first aspect or any possible implementation of the first aspect.

According to a fourth aspect, a terminal is provided. The terminal is configured to perform the method according to the second aspect or any possible implementation of the second aspect. Specifically, the terminal includes a unit configured to perform the method according to the second aspect or any possible implementation of the second aspect.

According to a fifth aspect, a computer-readable storage medium is provided. The storage medium includes an instruction. When the instruction runs on a terminal, the terminal performs the method according to the foregoing aspects or any possible implementation of the foregoing aspects.

According to a sixth aspect, a computer program product including an instruction is provided. When the computer program product runs on a terminal, the terminal performs the method according to the foregoing aspects or any possible implementation of the foregoing aspects.

According to a seventh aspect, a communications chip storing an instruction is provided. When the instruction runs on a terminal, the terminal performs the method according to the foregoing aspects or any possible implementation of the foregoing aspects.

BRIEF DESCRIPTION OF DRAWINGS

FIG. 1 is a schematic diagram of an application scenario according to this application;

FIG. 2 is a schematic diagram of another application scenario according to this application;

DESCRIPTION OF EMBODIMENTS

Figure 3:
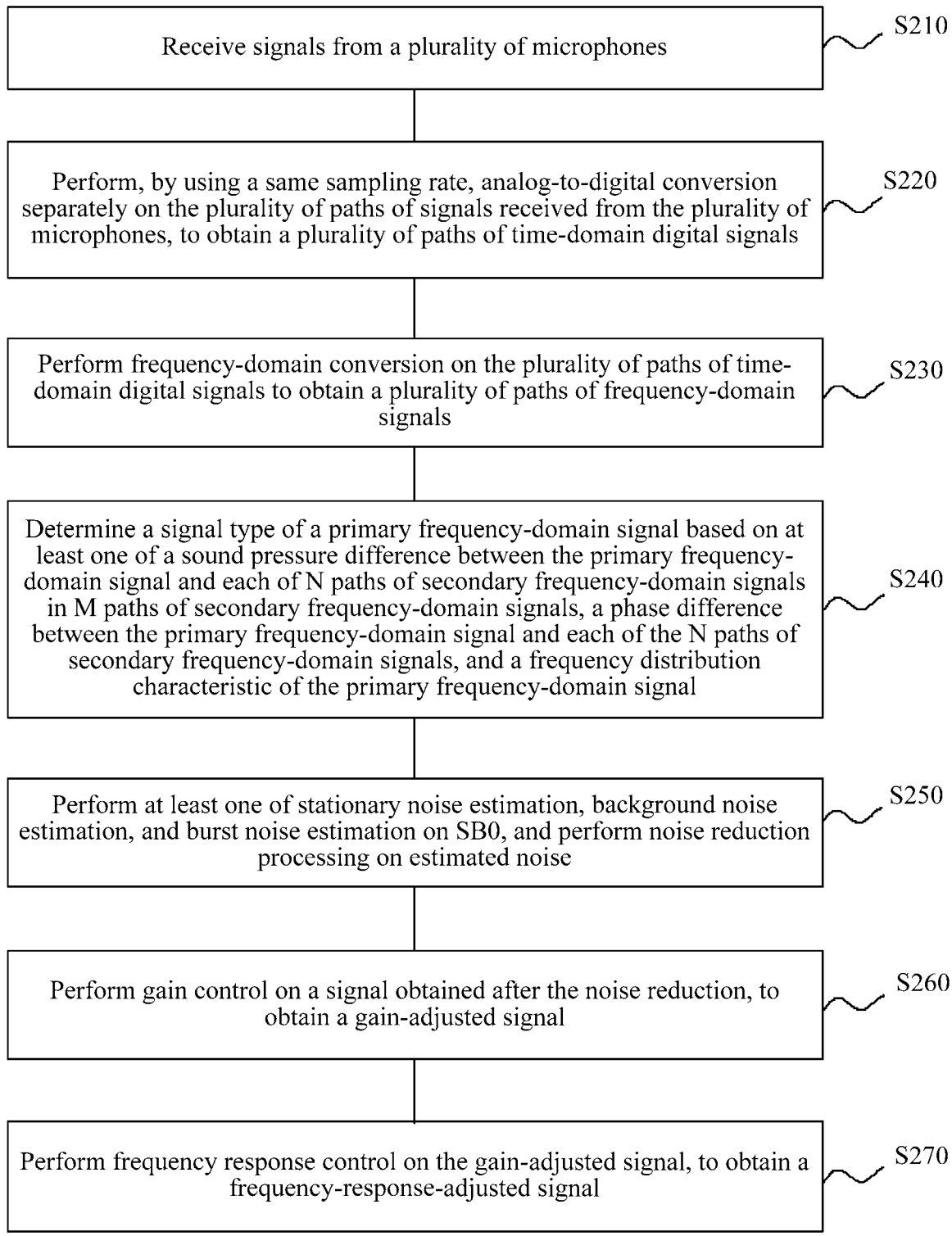
FIG. 3 is a schematic flowchart of a speech processing method according to an embodiment of this application.

The following describes technical solutions of this application with reference to accompanying drawings.

The technical solutions of the embodiments of this application may be applied to various communications systems, such as a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, Universal Mobile Telecommunications System (UMTS), a Worldwide Interoperability for Microwave Access (WiMAX) communications system, a future 5th generation (5G) system, or a new radio (NR) system.

The terminal in the embodiments of this application may be a mobile phone, a tablet personal computer, a media player, a smart television, a laptop computer, a personal digital assistant (PDA), a personal computer, a mobile Internet device, a wearable device such as a smartwatch, or the like. This is not limited in the embodiments of this application. Currently, mobile phones have become main calling devices, and during a call using mobile phones, handheld calling is a most widely applied calling manner. In some particular scenarios, there may be other persons alongside a calling party. To avoid disturbing the other persons, it is inconvenient for the calling party to speak loudly, and the calling party usually speaks in a low voice deliberately, and even speaks by whispering (usually known as a private conversation). During a call, various disturbing noise sources usually exist, such as echoes, reverberation, and environmental noise. A target speech needs to be separated from a disturbing sound by using a speech enhancement technology. Therefore, a target speech segment needs to be detected. However, because a vocal cord of a person does not vibrate during whispering, a speech feature is quite different from that of a normal speech (that is, a speech during normal speaking). In addition, all current speech detection manners are for a voiced speech with harmonics, and cannot distinguish between a whisper speech and a disturbing sound.

Therefore, how to detect a whisper speech becomes a problem urgently to be resolved.

Based on this, this application provides a speech processing method that can be applied to a terminal, so as to detect a whisper signal input from a primary microphone (that is, a whisper speech). Because the method does not depend on sensor information, a whisper speech can be identified without increasing device costs, thereby providing a basis for subsequent speech processing, and enhancing user experience during a whisper call.

Usually, a primary microphone is close to a target sound source, that is, close to the mouth of a user, and a secondary microphone is far away from the target sound source. This is not limited in the embodiments of this application. The primary microphone may be a microphone on the terminal or a microphone on an assistant device (for example, a handset of a mobile phone) connected to the terminal. In addition to receiving a signal input from the primary microphone, the terminal further receives a signal input from a secondary microphone. The terminal can determine a primary microphone and secondary microphones based on a current call mode or call manner of a user. In other words, the terminal can learn a path of signal input from a primary microphone and a path of signal input from a secondary microphone.

The following simply describes, with reference to application scenarios shown in FIG. 1 and FIG. 2, a terminal, and a primary microphone, and a secondary microphone that can be applied to this application.

FIG. 1 is a schematic diagram of an application scenario according to this application. As shown in FIG. 1, a terminal 100 includes a microphone 110 and a microphone 120. The microphone 110 and the microphone 120 may be disposed on the top or back of the terminal. This is not limited in the embodiments of this application. In a call mode in which a user holds the terminal, the terminal 100 determines the microphone 120 as a primary microphone, and determines the microphone 110 as a secondary microphone. In a mode in which the user makes a call by using a speaker, the terminal 100 determines the microphone 110 as a primary microphone, and determines the microphone 120 as a secondary microphone.

In addition, it should be noted that, if 130 of the terminal 100 is a microphone, in a call mode in which the user holds the terminal, usually, the terminal 100 determines the microphone as a secondary microphone. This is not limited in the embodiments of this application.

FIG. 2 is a schematic diagram of another application scenario according to this application. A terminal 100 included in FIG. 2 is the terminal 100 shown in FIG. 1. In a mode in which the user makes a call by using a handset, the terminal 100 determines a microphone 130 as a primary microphone, and determines microphones 110 and 120 as secondary microphones.

Figure 4:
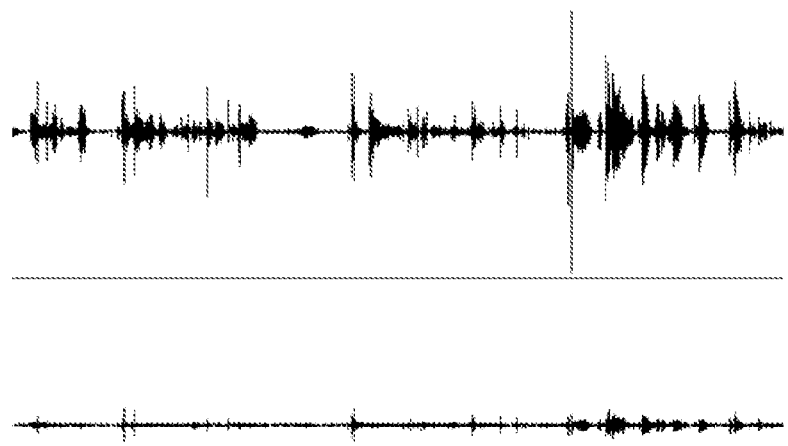
FIG. 4 is a time-domain diagram of signals SB0 and SB1.

The following describes a signal processing method in this application in detail with reference to FIG. 3 and FIG. 4.

FIG. 3 is a schematic flowchart of a signal processing method according to an embodiment of this application. The method shown in FIG. 3 may be performed by a terminal. The terminal may be the terminal 100 in the application scenarios shown in FIG. 1 and FIG. 2. This is not limited in this embodiment of this application. It should be understood that, FIG. 3 shows detailed steps or operations of the method, but the steps or operations are merely examples. In this embodiment of this application, another operation may further be performed, or only some operations in FIG. 3 are performed.

S210. Receive signals from a plurality of microphones.

It should be understood that, the signals received by the terminal include signals obtained after a target sound source, an echo, and environmental noise are propagated in space and arrive at the plurality of microphones after being reflected by a wall and an object.

The plurality of microphones include a primary microphone and M secondary microphones, M≥1, and M is an integer. That is, there may be one secondary microphone, two or three secondary microphones, or more secondary microphones. This is not limited in this embodiment of this application. For example, the plurality of microphones may include the secondary microphone 110 and the primary microphone 120 shown in FIG. 1. For another example, the plurality of microphones may include the primary microphone 130 and the secondary microphones 110 and 120 shown in FIG. 2.

In this embodiment of this application, without loss of generality, the signals input from the plurality of microphones and received by the terminal may be respectively denoted as MIC0, MIC1, . . . . For convenience of understanding and description, in the following, a signal received by the terminal from the primary microphone is denoted as MIC0, and signals received by the terminal from the M secondary microphones are respectively denoted as MIC1, MIC2, and MICM.

S220. Perform, by using a same sampling rate, analog-to-digital conversion on the plurality of paths of signals received from the plurality of microphones, to obtain a plurality of paths of time-domain digital signals.

For convenience of understanding and description, the plurality of paths of time-domain digital signals are respectively denoted as SA0, SA1, . . . , and SAM.

Specifically, the terminal converts analog signals received from the microphones into digital signals. The obtained digital signals MIC0, MIC1, . . . , and MICM are in a one-to-one correspondence with SA0, SA1, . . . , and SAM. That is, the terminal performs analog-to-digital conversion on MIC0 to obtain the signal SA0, performs analog-to-digital conversion on MIC1 to obtain the signal SA1, and by analog, performs analog-to-digital conversion on MICM to obtain the signal SAM.

S230. Perform time-to-frequency-domain conversion on the plurality of paths of time-domain digital signals (namely, SA0, SA1, . . . , SAM) to obtain a plurality of paths of frequency-domain signals.

For convenience of understanding and description, the plurality of paths of frequency-domain signals are respectively denoted as SB0, SB1, SB2, . . . , and SBM.

Specifically, the terminal converts the time-domain signals SA0, SA1, . . . , and SAM into the frequency-domain signals, to obtain a primary frequency-domain signal SB0 and M paths of secondary frequency-domain signals SB1, . . . , and SBM. SB0 corresponds to the primary microphone. That is, SB0 is a signal obtained after time-to-frequency-domain conversion is performed on SA0. SB1, SB2, . . . , and SBM are in a one-to-one correspondence with the M secondary microphones. That is, SB1, SB2, . . . , and SBM are signals obtained after time-to-frequency-domain conversion is performed on SA1, SA2, . . . , and SAM respectively.

S240. Determine a signal type of a primary frequency-domain signal based on at least one of a sound pressure difference between the primary frequency-domain signal and each of N paths of secondary frequency-domain signals in M paths of secondary frequency-domain signals, a phase difference between the primary frequency-domain signal and each of the N paths of secondary frequency-domain signals, and a frequency distribution characteristic of the primary frequency-domain signal, where 1≤N≤M, and N is an integer.

Optionally, the signal type includes a whisper signal and a normal speech signal. Usually, all speeches except whisper may be considered as normal speeches. A characteristic is that the normal speech has an obvious fundamental frequency and harmonic.

Therefore, the terminal may determine whether SB0 is the whisper signal based only on the sound pressure difference between the primary frequency domain signal and each of the N paths of secondary frequency-domain signals, or only on the sound pressure difference between the primary frequency domain signal and the phase difference of each of the N paths of secondary frequency-domain signals, or only on the frequency distribution characteristic of the primary frequency-domain signal.

Alternatively, the terminal may determine whether SB0 is the whisper signal based on the sound pressure difference and the phase difference of each of the N paths of secondary frequency-domain signals.

Alternatively, the terminal may determine whether SB0 is the whisper signal based on the sound pressure difference of each of the N paths of secondary frequency-domain signals and the frequency distribution characteristic of the primary frequency-domain signal.

Alternatively, the terminal may determine whether SB0 is the whisper signal based on the phase difference of each of the N paths of secondary frequency-domain signals and the frequency distribution characteristic of the primary frequency-domain signal.

Alternatively, the terminal may determine whether SB0 is the whisper signal based on the sound pressure difference of each of the N paths of secondary frequency-domain signals, the phase difference of each of the N paths of secondary frequency-domain signals, and the frequency distribution characteristic of the primary frequency-domain signal.

It should be understood that, determining whether SB0 is the whisper signal is determining whether MIC0 is the whisper signal.

The N paths of secondary frequency-domain signals may be some or all of SB1, SB2, . . . , and SBM.

For example, when the N paths of secondary frequency-domain signals are some of SB1, SB2, . . . , and SBM, the N paths of secondary frequency-domain signals may be selected according to the following rules:

selecting, from SB1, SB2, . . . , and SBM, N paths of signals having maximum energy as the N paths of secondary frequency-domain signals; or selecting, from SB1, SB2, . . . , and SBM, N paths of signals whose corresponding secondary microphones are closest to the primary microphone as the N paths of secondary frequency-domain signals; or randomly selecting, from SB1, SB2, . . . , and SBM, N paths of signals as the N paths of secondary frequency-domain signals.

It should be understood that, the foregoing selection rules are merely examples for description, and a manner of selecting the N paths of secondary frequency-domain signals from SB1, SB2, . . . , and SBM is not limited in this application.

The sound pressure difference, the phase difference, and the frequency distribution characteristic mentioned above are described below.

Usually, the plurality of microphones have different locations. Therefore, signals received by the terminal from different microphones differ from each other. This is equivalent to that SB0, SB1, SB2, . . . , and SBM differ from each other. The variation is mainly reflected in an energy variation and a phase variation.

The energy variation may be represented by the sound pressure difference. That is, the sound pressure difference represents an energy variation between signals, and reflects, to some extent, a location relationship between a microphone and a target sound source. Without any occlusion, a closer distance between a microphone and the target sound source indicates larger energy. The sound pressure difference may be calculated in a plurality of manners. This is not limited in this embodiment of this application.

For example, a sound pressure difference between SB0 and a path of secondary frequency-domain signal, for example, a sound pressure difference between SB0 and SB1, may be represented by an amplitude difference between SB0 and SB1 or an amplitude ratio of SB0 to SB1.

FIG. 4 is a time-domain diagram of the signals SB0 and SB1. In the figure, an abscissa represents time, and an ordinate represents amplitude of a signal. In FIG. 4, a signal above the line is SB0, and a signal below the line is SB1. It may be learned that amplitude of SB0 is greater than amplitude of SB1.

The phase variation may be represented by the phase difference. The phase difference may represent a time difference of arrival of a signal at different microphones. For example, in a handheld calling scenario, the target sound source is a mouth. The target sound source first arrives at the primary microphone and then arrives at the secondary microphone without considering flipping of the terminal. The phase difference may be calculated in a plurality of manners. This is not limited in this embodiment of this application.

For example, a phase difference between SB0 and a path of secondary frequency-domain signal, for example, a phase difference between SB0 and SB1, may be represented by an amplitude difference between SB0 and SB1 or an amplitude ratio of SB0 to SB1.

Figure 5:
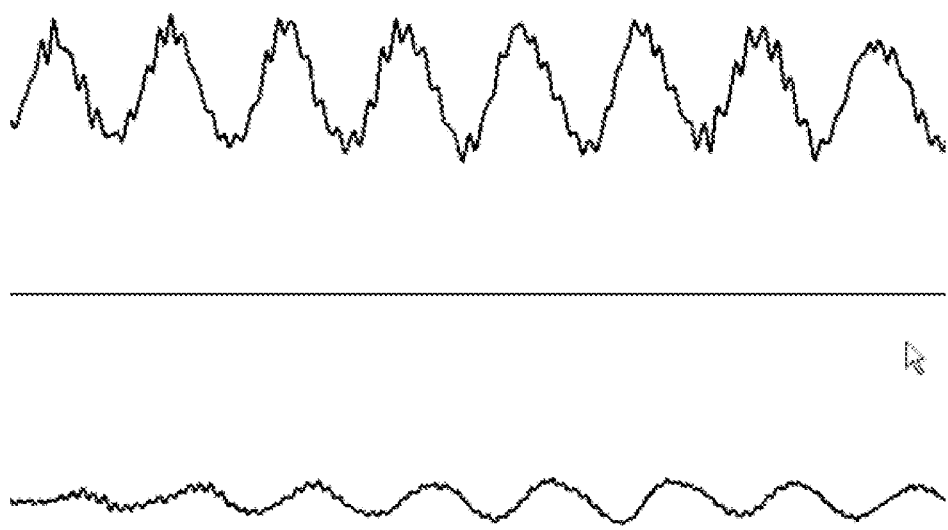
FIG. 5 is an enlarged time-domain diagram of signals SB0 and SB1.

FIG. 5 is a time-domain diagram of the signals SB0 and SB1. In FIG. 5, a signal above the line is SB0, and a signal below the line is SB1. FIG. 5 is an enlarged partial view of FIG. 4. It can be learned from FIG. 5 that, a phase of SB0 is ahead of that of SB1. This indicates that SB0 is closer to the primary microphone. Due to a limitation of a human pronunciation mechanism, a frequency distribution characteristic of a speech varies with a volume.

For frequency distributions in which one person speaks one sentence at different volumes, in a speech at a normal volume, a voiced harmonic quantity is largest, and energy of a frequency range is largest. In a speech with a small volume, a harmonic quantity is significantly less than that in the speech at the normal volume, and energy of a frequency range is also less than that in the speech at the normal volume. In a whisper speech, there is no harmonic absolutely, and energy of a frequency range is smallest, especially at the start and end of the speech. A signal-to-noise ratio (SNR) is very low, and it is very difficult to distinguish between the speech and background noise.

Based on this, in this embodiment of this application, a frequency distribution characteristic of SB0 may be described by using whether there is a fundamental frequency, a harmonic quantity, and the like. This is not limited in this embodiment of this application.

Therefore, according to the speech processing method in this embodiment of this application, whether the primary frequency-domain signal is a whisper signal may be determined based on at least one of the sound pressure difference between the primary frequency-domain signal and each of the N paths of secondary frequency-domain signals in the M paths of secondary frequency-domain signals, the phase difference between the primary frequency-domain signal and each of the N paths of secondary frequency-domain signals, and the frequency distribution characteristic of the primary frequency-domain signal. Because the method in this embodiment of this application does not depend on sensor information, the whisper speech can be identified without increasing device costs, thereby providing a basis for subsequent speech processing, and enhancing user experience during a whisper call.

The following describes several optional specific implementations of S240 in detail with reference to the foregoing described sound pressure difference, phase difference, and frequency distribution characteristic.

Implementation 1

SB0 may be determined as a whisper signal when one or more of conditions (a) to (c) are satisfied.

In addition, it should be noted that, for ease of better understanding this application by a person skilled in the art, the following specifically describes this embodiment of this application by using an example in which the N paths of secondary frequency-domain signals are SB1 and SB2.

(a) A sound pressure difference between SB0 and each of the N paths of secondary frequency-domain signals is greater than or equal to a corresponding first threshold and is less than a corresponding second threshold.

Specifically, SB1 and SB2 each correspond to one first threshold and one second threshold. That is, SB1 corresponds to one first threshold (denoted as v11) and one second threshold (denoted as v12), and SB2 corresponds to one first threshold (denoted as v21) and one second threshold (v22). v11 may be equal to or not equal to v21, and v12 may be equal to or not equal to v22. This is not limited in this embodiment of this application. For example, v11=v21=1.6, and/or v12=v22=2.3. A sound pressure difference D01 between SB0 and SB1 and a sound pressure difference D02 between SB0 and SB2 are calculated. It is determined whether v11≤D01≤v12 and v21≤D02≤v22 are true. If v11≤D01≤v12 and v21≤D02≤v22 are true, the condition (a) is satisfied.

(b) A phase difference between SB0 and each of the N paths of secondary frequency-domain signals is greater than or equal to a corresponding third threshold and is less than a corresponding fourth threshold.

Specifically, SB1 and SB2 each correspond to one third threshold and one fourth threshold. That is, SB1 corresponds to one third threshold (denoted as v13) and one fourth threshold (denoted as v14), and SB2 corresponds to one third threshold (denoted as v23) and one fourth threshold (v24). v13 may be equal to or not equal to v23, and v14 may be equal to or not equal to v24. This is not limited in this embodiment of this application. For example, v13=v23=0.1 millisecond (ms), and/or v14=v24=0.3 ms. A phase difference F01 between SB0 and SB1 and a phase difference F02 between SB0 and SB2 are calculated. It is determined whether v13≤F01≤v14 and v23≤F02≤v24 are true. If v13≤F01≤v14 and v23≤F02≤v24 are true, the condition (b) is satisfied.

It should be understood that, the first threshold, the second threshold, the third threshold, and the fourth threshold each may be determined based on a location of a corresponding microphone. For example, v11 may be determined based on a location of a microphone corresponding to v11, and v21 may be determined based on a location of a microphone corresponding to v21. However, it should be understood that, a specific manner of determining the foregoing thresholds is not limited in this application.

(c) SB0 satisfies at least one of (c1) to (c3).

(c1) There is no fundamental frequency.

Specifically, there are many general methods for detecting a fundamental frequency. For example, whether SB0 has a fundamental frequency may be detected by using a time-domain autocorrelation method. For details, refer to the prior art. For brevity, details are not described herein.

(c2) A harmonic quantity is less than or equal to a fifth threshold.

For example, the harmonic quantity may be determined based on a detection result of a fundamental frequency. For example, it may be determined whether energy of a frequency range near a location of a multiplied frequency of the fundamental frequency is a peak value. If the energy is a peak value, the fundamental frequency is in a harmonic frequency range. Otherwise, the fundamental frequency is not in a harmonic frequency range, and a counted quantity of harmonic frequency ranges is the harmonic quantity. Then, it is determined whether the harmonic quantity is less than or equal to the fifth threshold. For example, the fifth threshold may be 4.

It should be understood that, a method for determining the harmonic quantity is not limited in this application.

(c3) A sub-band having maximum sub-band energy belongs to a first frequency band, and a difference between normalized energy of each of at least three sub-bands included in SB0 and normalized energy of a corresponding sub-band in at least three sub-bands included in a predefined whisper signal is less than a corresponding sixth threshold.

The at least three sub-bands included in SB0 are in a one-to-one correspondence with the at least three sub-bands included in the predefined whisper signal, each of the at least three sub-bands included in SB0 corresponds to one sixth threshold, the normalized energy of each sub-band is a ratio of energy of the sub-band to total energy of the at least three sub-bands, and the energy of the sub-band is a sum of energy of frequency ranges in the sub-band.

For example, spectra of SB0 and the predefined whisper signal each may be divided into 20 sub-bands through even division or uneven division. It should be understood that, spectrum division manners of the predefined whisper signal and SB0 may be the same or different. Then, for the predefined whisper signal and SB0, a sum of energy of frequency ranges in each sub-band is calculated as energy of the sub-band, and a sum Pw of energy of the 20 sub-bands is calculated. Next, a ratio of the energy of each of the 20 sub-bands to Pw is calculated, to obtain 20 ratios. The 20 ratios are normalized energy of the 20 sub-bands. A maximum ratio in the 20 ratios obtained based on SB0 is found, and it is determined whether a sub-band corresponding to the ratio belongs to the first frequency band. The first frequency band may be a middle frequency band, for example, 500 Hz to 1000 Hz. In this case, if the sub-band corresponding to the maximum ratio in the 20 ratios obtained based on SB0 falls within 500 Hz to 1000 Hz, it is considered that the maximum ratio belongs to the first frequency band.

Next, based on the 20 ratios obtained based on SB0 and the 20 ratios obtained based on the predefined whisper signal, a difference between normalized energy of the first sub-band that is obtained based on SB0 and normalized energy of the first sub-band that is obtained based on the predefined whisper signal is calculated, a difference between normalized energy of the second sub-band that is obtained based on SB0 and normalized energy of the second sub-band that is obtained based on the predefined whisper signal is calculated, and by analog, a difference between normalized energy of the twentieth sub-band that is obtained based on SB0 and normalized energy of the twentieth sub-band that is obtained based on the predefined whisper signal is calculated. Then, it is determined whether the 20 differences are less than the corresponding sixth threshold. That is, each sub-band corresponds to one sixth threshold, and the sixth thresholds corresponding to the sub-bands may be equal or not equal. This is not limited in this embodiment of this application. For example, the sixth thresholds may be equal to 2.

It should be understood that, the predefined whisper signal may be a whisper speech signal collected in advance. The normalized energy of each sub-band in the predefined whisper signal may be calculated in advance and stored in the terminal. In this case, when the signal type of SB0 is determined in real time, the terminal only needs to calculate the normalized energy of each sub-band in SB0.

It should further be understood that, in this embodiment of this application, calculating the normalized energy of each sub-band is merely used as an example for description. During specific implementation, only energy of each sub-band may be calculated, and corresponding normalized energy is not calculated. In this case, a corresponding sixth threshold may be not equal to the described sixth threshold. In addition, for a manner of calculating energy of each frequency range, refer to the prior art, and details are not described herein.

In conclusion, SB0 may be determined as a whisper signal if any one or combination of or all of the conditions (a), (b), and (c1) to (c3) is satisfied.

Implementation 2

SB0 may be determined as a whisper signal when any one of conditions (d) to (f) is satisfied.

(d) A sound pressure difference between SB0 and each of the N paths of secondary frequency-domain signals is greater than or equal to a corresponding seventh threshold.

Specifically, SB1 and SB2 each correspond to one seventh threshold. That is, SB1 corresponds to one seventh threshold (denoted as v17), and SB2 corresponds to one seventh threshold (denoted as v27). v17 may be equal to or not equal to v27. This is not limited in this embodiment of this application. For example, v17=v27=1.6. A sound pressure difference D01 between SB0 and SB1 and a sound pressure difference D02 between SB0 and SB2 are calculated. It is determined whether v17≤D01 and v27≤D02 are true. If 17≤D01 and v27≤D02 are true, the condition (d) is satisfied.

(e) A phase difference between SB0 and each of the N paths of secondary frequency-domain signals is greater than or equal to a corresponding eighth threshold.

Specifically, SB1 and SB2 each correspond to one eighth threshold. That is, SB1 corresponds to one eighth threshold (denoted as v18), and SB2 corresponds to one eighth threshold (denoted as v28). v18 may be equal to or not equal to v28. This is not limited in this embodiment of this application. For example, v18=v28=0.1 millisecond (ms). A phase difference F01 between SB0 and SB1 and a phase difference F02 between SB0 and SB2 are calculated. It is determined whether v18≤F01 and v28≤F02 are true. If v18≤F01 and v28≤F02 are true, the condition (e) is satisfied.

It should be understood that, the foregoing described seventh threshold and eighth threshold each may be determined based on a location of a corresponding microphone. For example, v17 may be determined based on a location of a microphone corresponding to v17, and v27 may be determined based on a location of a microphone corresponding to v27. However, it should be understood that, a specific manner of determining the seventh threshold and the eighth threshold is not limited in this application.

(f) SB0 satisfies at least one of the following conditions:
there is no fundamental frequency;
a harmonic quantity is less than or equal to a fifth threshold; and
a sub-band having maximum sub-band energy belongs to a first frequency band, and a difference between normalized energy of each of at least three sub-bands included in SB0 and normalized energy of a corresponding sub-band in at least three sub-bands included in a predefined whisper signal is less than a corresponding sixth threshold. The at least three sub-bands included in SB0 are in a one-to-one correspondence with the at least three sub-bands included in the predefined whisper signal, each of the at least three sub-bands included in SB0 corresponds to one sixth threshold, the normalized energy of each sub-band is a ratio of energy of the sub-band to total energy of the at least three sub-bands, and the energy of the sub-band is a sum of energy of frequency ranges in the sub-band.

It should be understood that, the condition (f) is the foregoing described condition (c). Therefore, for the condition (f), specifically refer to the description of the condition (c). For brevity, details are not described herein again.

In conclusion, SB0 may be determined as a whisper speech if any one or combination of or all of the conditions (d), (e), and (c1) to (c3) is satisfied.

When SB0 is determined as a whisper signal, optionally, the method further includes one or more of step S250 to step S270.

S250. Perform at least one of stationary noise estimation, background human noise estimation, and burst noise estimation on SB0, and perform noise reduction processing on estimated noise.

Specifically, the terminal may perform only stationary noise estimation, background human noise estimation, or burst noise estimation on SB0. Alternatively, the terminal may perform two of stationary noise estimation, background human noise estimation, and burst noise estimation on SB0. Alternatively, the terminal may perform stationary noise estimation, background human noise estimation, and burst noise estimation on SB0. Alternatively, the terminal first performs stationary noise estimation on SB0, then performs noise reduction processing on estimated stationary noise, and further performs background human noise estimation on a signal obtained after the noise reduction processing. Next, the terminal performs noise reduction processing on estimated background human noise, then performs burst noise estimation on a signal obtained after the noise reduction processing, and further performs noise reduction processing on estimated burst noise. It should be understood that, a sequence of the stationary noise estimation, the background human noise estimation, and the burst noise estimation is not limited in this application.

It should be understood that, the background human noise may be a sound produced in a scene of a conference room by a plurality of persons by discussing a problem when a speaker is making a speech. The burst noise may be a sound of collision between a desk and a chair, an impact sound occurs when a pen drops on a desk, a door closing sound, or the like.

The stationary noise estimation method during whispering is similar to that in the normal speech. For example, a minima controlled recursive averaging (MCRA) method may be used for performing stationary noise estimation on the whisper signal. For details, refer to the prior art. For brevity, details are not described herein. It should be understood that, this application is not limited to the stationary noise estimation method.

Normal noise reduction processing cannot satisfy a whisper speech call scenario. A whisper call has higher requirements on noise reduction. This is mainly reflected in: (1) Because the whisper speech has no harmonic, and an SNR of the whisper signal is far lower than that in a normal speech call scenario, separating whispering from noise is more difficult. (2) The whisper speech has a significantly lower volume than the normal speech. To enable a calling peer party to clearly hear what is saying, a larger gain needs to be applied. Therefore, this requires less damage on the whisper speech during noise reduction. Otherwise, the whisper speech is damaged more seriously after the signal is amplified. (3) Because there are usually one or more persons in the whisper speech call scenario, and there is relatively much background human noise and relatively much burst noise, relatively high noise reduction effectiveness is needed. Otherwise, after a gain is amplified, the background noise is very obvious, seriously affecting call experience. Therefore, compared with manners of performing noise estimation and noise reduction processing on the normal speech, when noise estimation and noise reduction processing are performed on the whisper signal, corresponding parameters need to be adjusted.

Optionally, the performing background human noise estimation on SB0 includes: performing background human noise estimation on the primary frequency-domain signal by using an adaptive beamformer whose beam width is a first width.

In other words, when background human noise estimation is performed on SB0, the beam width of the adaptive beamformer is the first width.

The first width is less than a preset beam width. For example, the first width may be obtained by reducing the preset beam width by 30%. The preset beam width is a beam width of the adaptive beamformer when background human noise estimation is performed on a normal speech (or a normal speech signal). The first width may be adaptively adjusted or may be predefined. This is not limited in this embodiment of this application.

Specifically, during a whisper speech call, a user posture is relatively fixed. Properly reducing the beam width of the adaptive beamformer during processing of the normal speech and directing a beam gazing direction to a mouth location of a target speaker can estimate as much background human noise as possible without damaging the speech. The adaptive beamformer may use a minimum variance distortionless response (MVDR) method or another method. This is not limited in this embodiment of this application. For the MVDR, specifically refer to the prior art. For brevity, details are not described herein.

Further, for a background human voice within an adaptive beam range, far- and near-field signals can be distinguished by using a sound pressure difference between primary and secondary microphones. During handheld calling using the whisper speech, a calling location is relatively fixed. For an array consisting of primary and secondary microphones, a sound source of a target speaker belongs to a near field, and a sound source of a background speaker belongs to a far field. The near-field sound source usually has a relatively large sound pressure difference between the primary and secondary microphones, so as to determine a majority of the whisper speech, and the remaining whisper speech may be prevented, through smooth processing, from being eliminated.

Optionally, the performing burst noise estimation on SB0 includes:

collecting statistics about a change speed of a primary frequency-domain signal in a first time window by using the first time window whose time window length is less than a preset length; determining, when the change speed of the signal is greater than a preset speed threshold, whether normalized energy of each sub-band of the primary frequency-domain signal in the first time window is greater than or equal to a corresponding ninth threshold, and whether normalized energy of all sub-bands of the primary frequency-domain signal in the first time window is diminished in ascending order of frequencies, where the primary frequency-domain signal in the first time window includes at least one sub-band, the normalized energy of each sub-band is a ratio of energy of the sub-band to total energy of the at least one sub-band, and the energy of the sub-band is a sum of energy of frequency ranges in the sub-band; and determining the signal in the first time window as burst noise when the normalized energy of each sub-band of the primary frequency-domain signal in the first time window is greater than or equal to the corresponding ninth threshold and the normalized energy of all the sub-bands of the primary frequency-domain signal in the first time window is diminished in ascending order of frequencies.

It should be understood that, each sub-band of the primary frequency-domain signal in the first time window corresponds to one ninth threshold, and all ninth thresholds may be equal or not equal. For example, all the ninth thresholds may be diminished in ascending order of frequencies of sub-bands corresponding to the ninth thresholds. The ninth threshold may be equal to or nor equal to the corresponding sixth threshold. This is not limited in this embodiment of this application. For calculation of the normalized energy of each sub-band of the primary frequency-domain signal in the first time window, refer to calculation of the normalized energy of the sub-band of SB0. For brevity, details are not described herein again.

Specifically, affected by a speech production manner of whispering, pronunciation of a same syllable during whispering is usually longer than that in the normal speech. That is, a signal is relatively smooth. The burst noise is similar to a pulse signal, and fluctuates greatly in a short time. Therefore, a time-domain feature of a signal may be used to collect statistics about the change speed of the signal in the first time window. For example, a window length of the first time window may be 30 ms. The first time window is equally divided into 10 sub-windows, and a sub-window length is 3 ms. Statistics about an average energy value of each sub-window are collected. Then, an average energy value of a current sub-window is divided by an average energy value of a previous sub-window, to determine whether a ratio exceeds the preset speed threshold. If the ratio exceeds the preset speed threshold, the signal in the first time window may be burst noise, and a signal frequency distribution needs to be further determined. Herein, the preset speed threshold may be 3, indicating that energy of the current sub-window is three times that of the previous sub-window. The preset speed threshold is not limited in this application.

In terms of a frequency domain, there is an obvious variation between frequency distributions of the burst noise and a speech signal, and energy of sub-bands has a relatively small variation, and is continuously distributed from a low frequency to a high frequency. Therefore, whether the signal is burst noise may be determined by using sub-band energy. Based on this, in this application, when the change speed is greater than the preset speed threshold, it is determined whether the normalized energy of the primary frequency-domain signal in the first time window is greater than or equal to the corresponding ninth threshold. The signal in the first time window is determined as burst noise when the normalized energy of each sub-band of the primary frequency-domain signal in the first time window is greater than or equal to the corresponding ninth threshold and the normalized energy of all the sub-bands of the primary frequency-domain signal in the first time window is diminished in ascending order of frequencies.

According to speech processing method in this embodiment of this application, a noise reduction policy for background human noise and the burst noise is adjusted with reference to a characteristic of a whisper call scenario, and intelligibility of the whisper speech can be enhanced by improving noise reduction effectiveness and accuracy for the background human noise and the burst noise.

S260. Perform gain control on a signal obtained after the noise reduction, to obtain a gain-adjusted signal.

Specifically, the performing gain control on a signal obtained after the noise reduction is increasing or reducing the signal obtained after the noise reduction.

Optionally, when gain control is performed on the signal obtained after the noise reduction, at least one of the following conditions is satisfied: a gain lower limit is a target lower limit, a gain upper limit is a target upper limit, a maximum level value of the signal obtained after the noise reduction is a target level value, and a gain smoothing speed is a target speed.

The target lower limit is greater than a preset lower limit, the target upper limit is less than a preset upper limit, the target level value is less than a preset level value, and the target speed is less than a preset speed.

It should be noted that, the preset lower limit, the preset upper limit, the preset level value, and the preset speed respectively correspond to corresponding parameters existing when gain control is performed on the normal speech.

Compared with gain control on the normal speech, specifically, because energy of the whisper speech is much less than that of the normal speech, the gain lower limit needs to be increased properly, and the gain upper limit needs to be reduced properly, thereby ensuring a normal call. The target level value is a maximum level value of a level of the whisper signal. Excessive amplification of the whisper signal causes deterioration of audibility. For example, after a 10 dB gain is applied to the normal speech, clarity and intelligibility become better. However, only a 6 dB gain can be applied to the whisper speech. Otherwise, an obvious rustling sound is heard, leading to a large value of loudness but poor intelligibility. Therefore, the target level value needs to be lower than that in the normal speech, for example, may be set to −9 dB or below. In the whisper speech scenario, the gain smoothing speed needs to reduced properly. Otherwise, a speech fluctuation is caused. For example, the gain smoothing speed may be reduced to 60% of a gain smoothing speed in the normal speech, thereby reducing the speech fluctuation.

According to the speech processing method in this embodiment of this application, a gain processing policy is adjusted with reference to a characteristic of the whisper call scenario, and a volume and smoothness of the whisper speech can be improved by properly increasing the volume, reducing a target level threshold, and slowing the gain smoothing speed.

S270. Perform frequency response control on the gain-adjusted signal, to obtain a frequency-response-adjusted signal.

Specifically, the performing frequency response control on the gain-adjusted signal is adjusting amplitude of the gain-adjusted signal in the frequency domain.

Optionally, the performing frequency response control on the gain-adjusted signal includes: performing frequency response control on a first frequency band of the gain-adjusted signal by using a first target frequency response, performing frequency response control on a second frequency band of the gain-adjusted signal by using a second target frequency response, and performing frequency response control on a third frequency band of the gain-adjusted signal by using a third target frequency response.

The first target frequency response is greater than or equal to a first preset frequency response, the second target frequency response is greater than a second preset frequency response, and the third target frequency response is less than a third preset frequency response. A minimum frequency in the first frequency band is greater than or equal to a maximum frequency in the second frequency band and is less than or equal to a minimum frequency in the third frequency band. That is, the first frequency band is a middle frequency band, the second frequency band is a low frequency band, and the third frequency band is a high frequency band. For example, the low frequency band may be 0 to 500 Hz, the middle frequency band may be 500 Hz to 2000 Hz, and the high frequency band may be a frequency band higher than 2000 Hz.

It should be noted that, the first preset frequency response, the second preset frequency response, and the third preset frequency response respectively correspond to frequency responses existing when frequency response control is performed on a middle frequency band, a low frequency band, and a high frequency band in the normal speech.

Compared with frequency response control on the normal speech, specifically, the whisper speech has a relatively small proportion of low-frequency components, and low-frequency response needs to be raised properly. Otherwise, a sound is weak. Certainly, there is a particular variation between proportions of low-frequencies components during whispering of different speakers. For some persons, a high-frequency signal even needs to be suppressed properly. Whether to raise a low-frequency signal or suppress a high-frequency signal mainly depends on a proportion of low-frequency components. For example, when the proportion of low-frequency components is less than 25%, the low-frequency phenomenon is increased. Otherwise, the low-frequency phenomenon is suppressed. Usually, for a middle-frequency response, the frequency response remains unchanged or is slightly increased. During gain control, because a relatively large gain is usually applied to the whisper speech, a sharp sound may be caused. Therefore, a high-frequency part of a signal needs to be suppressed properly, to prevent a whistling sound.

According to the method in this embodiment of this application, a frequency response processing policy is adjusted with reference to a characteristic of the whisper call scenario, and sound quality of the whisper speech can be improved by emphasizing correction of low and high frequency responses.

Therefore, according to the method in this embodiment of this application, operations such as noise estimation, proper noise reduction processing, gain control, and frequency response control are performed on the identified whisper speech, to improve quality of the whisper speech, improve whisper intelligibility, and further improve user experience during a whisper call.

The foregoing describes the speech processing method in this embodiment of this application in detail with reference to FIG. 2. The following specifically describes a terminal to which the speech processing method may be applied.

Figure 6:
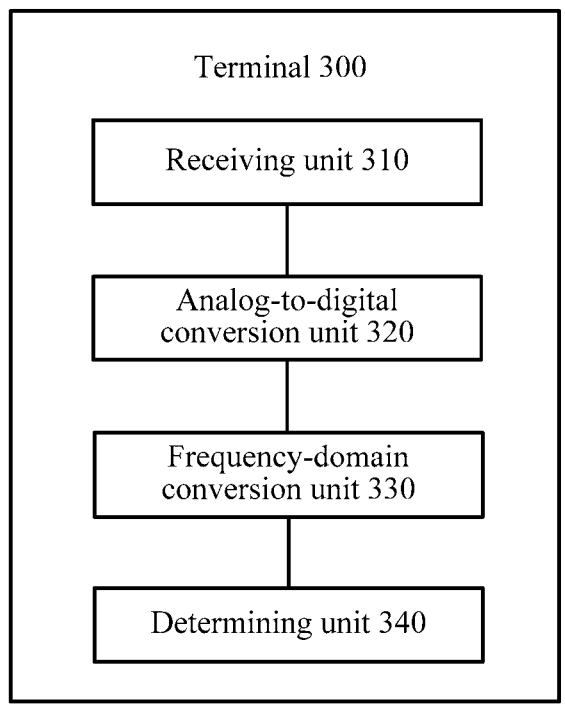
FIG. 6 is a schematic block diagram of a terminal according to an embodiment of this application.

FIG. 6 is a schematic block diagram of a terminal 300 according to an embodiment of this application. As shown in FIG. 6, the terminal 300 includes a receiving unit 310, an analog-to-digital conversion unit 320, a time-to-frequency-domain conversion unit 330, and a determining unit 340.

The receiving unit 310 is configured to receive signals from a plurality of microphones. The plurality of microphones include a primary microphone and M secondary microphones, M≥1, and M is an integer.

The analog-to-digital conversion unit 320 is configured to perform, by using a same sampling rate, analog-to-digital conversion on the plurality of paths of signals received from the plurality of microphones, to obtain a plurality of paths of time-domain digital signals.

The time-to-frequency-domain conversion unit 330 is configured to perform time-to-frequency-domain conversion on the plurality of paths of time-domain digital signals to obtain a plurality of paths of frequency-domain signals. The plurality of paths of frequency-domain signals include one path of primary frequency-domain signal and M paths of secondary frequency-domain signals, the primary frequency-domain signal corresponds to the primary microphone, and the M paths of secondary frequency-domain signals are in a one-to-one correspondence with the M secondary microphones.

The determining unit 340 is configured to determine a signal type of the primary frequency-domain signal based on at least one of a sound pressure difference between the primary frequency-domain signal and each of N paths of secondary frequency-domain signals in the M paths of secondary frequency-domain signals, a phase difference between the primary frequency-domain signal and each of the N paths of secondary frequency-domain signals, and a frequency distribution characteristic of the primary frequency-domain signal, where 1≤N≤M, and N is an integer.

It should be understood that, the terminal 300 may further include a unit configured to perform other operations in the foregoing method. The units in the terminal 300 are separately configured to perform the actions or processing processes performed by the terminal in the foregoing method, and therefore, can also implement the beneficial effects in the foregoing method embodiment. Herein, to avoid repetition, details are omitted.

Optionally, functions of the units in the terminal 300 can be implemented by a processor. This is not limited in this embodiment of this application.

Further, the processor may include an integrated circuit (IC), for example, may include an individually encapsulated IC, or may be formed by connecting a plurality of encapsulated ICs having a same function or different functions. The processor may be a central processing unit (CPU), or the processor may be another general-purpose processor, a digital signal processor (DSP), an application-specific integrated circuit (ASIC), a field-programmable gate array (FPGA), or another programmable logic device, a discrete gate or a transistor logic device, a discrete hardware component, or the like. The general-purpose processor may be a microprocessor or the processor may be any conventional processor or the like. This is not limited in this embodiment of the present invention.

Optionally, the terminal 300 may further include a memory that may be configured to store a software program or module. In this case, the processor may run or execute the software program and/or module stored in the memory, and invoke data stored in the memory, to implement various functions and/or data processing of the terminal.

Figure 7:
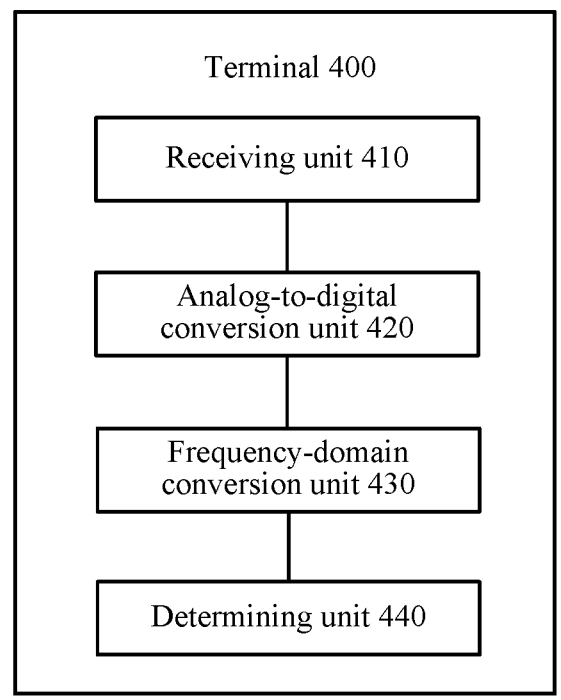
FIG. 7 is a schematic block diagram of a terminal according to another embodiment of this application.

FIG. 7 is a schematic block diagram of a terminal 400 according to another embodiment of this application. As shown in FIG. 7, the terminal 400 includes a receiving unit 410, an analog-to-digital conversion unit 420, a time-to-frequency-domain conversion unit 430, and a determining unit 440.

The receiving unit 410 is configured to receive signals from a plurality of microphones. The plurality of microphones include a primary microphone and M secondary microphones, M≥1, and M is an integer.

The analog-to-digital conversion unit 420 is configured to perform, by using a same sampling rate, analog-to-digital conversion on the plurality of paths of signals received from the plurality of microphones, to obtain a plurality of paths of time-domain digital signals.

The time-to-frequency-domain conversion unit 430 is configured to perform time-to-frequency-domain conversion on the plurality of paths of time-domain digital signals to obtain a plurality of paths of frequency-domain signals. The plurality of paths of frequency-domain signals include one path of primary frequency-domain signal and M paths of secondary frequency-domain signals, the primary frequency-domain signal corresponds to the primary microphone, and the M paths of secondary frequency-domain signals are in a one-to-one correspondence with the M secondary microphones.

The determining unit 440 is configured to determine a signal type of the primary frequency-domain signal based on at least one of a sound pressure difference between the primary frequency-domain signal and each of N paths of secondary frequency-domain signals in the M paths of secondary frequency-domain signals and a frequency distribution characteristic of the primary frequency-domain signal, where 1≤N≤M, and N is an integer.

It should be understood that, the terminal 400 may further include an operation used for performing other operations in the foregoing method. The units in the terminal 400 are separately configured to perform the actions or processing processes performed by the terminal in the foregoing method, and therefore, can also implement the beneficial effects in the foregoing method embodiment. Herein, to avoid repetition, details are omitted.

Optionally, functions of the units in the terminal 400 can be implemented by a processor. This is not limited in this embodiment of this application.

Further, the processor may include an integrated circuit (IC), for example, may include an individually encapsulated IC, or may be formed by connecting a plurality of encapsulated ICs having a same function or different functions. The processor may be a central processing unit (CPU), or the processor may be another general-purpose processor, a digital signal processor (DSP), an application-specific integrated circuit (ASIC), a field-programmable gate array (FPGA), or another programmable logic device, a discrete gate or a transistor logic device, a discrete hardware component, or the like. The general-purpose processor may be a microprocessor or the processor may be any conventional processor or the like. This is not limited in this embodiment of the present invention.

Optionally, the terminal 400 may further include a memory that may be configured to store a software program or module. In this case, the processor may run or execute the software program and/or module stored in the memory, and invoke data stored in the memory, to implement various functions and/or data processing of the terminal.

Figure 8:
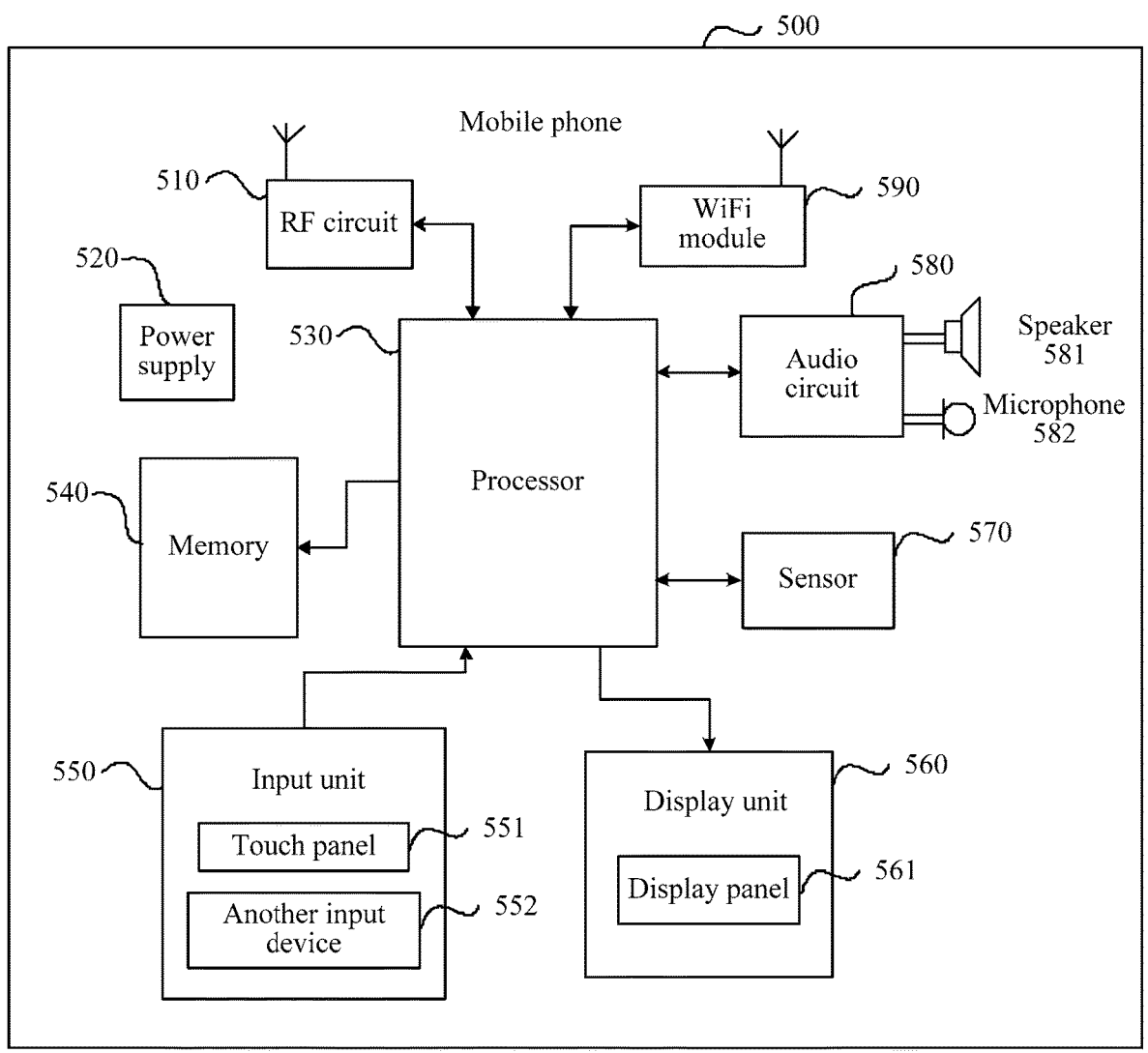
FIG. 8 is a schematic block diagram of a terminal according to still another embodiment of this application.

FIG. 8 is a schematic block diagram of a terminal 500 according to an embodiment of this application. That the terminal 500 is a mobile phone is used as an example. FIG. 8 is a block diagram of a part of a structure of the mobile phone 500 in this embodiment of this application. Referring to FIG. 8, the mobile phone 500 includes components such as a radio frequency (RF) circuit 510, a power supply 520, a processor 530, a memory 540, an input unit 550, a display unit 560, a sensor 570, an audio circuit 580, and a wireless fidelity (WiFi) module 590. A person skilled in the art may understand that the structure of the mobile phone shown in FIG. 8 does not constitute a limitation on the mobile phone, and the mobile phone may include more or fewer components than those shown in the figure, or some components may be combined, or different component arrangements may be used.

The following specifically describes the components of the mobile phone 500 with reference to FIG. 8.

The RF circuit 510 may be configured to receive and send a signal during an information receiving and sending process or a call process. Specifically, the RF circuit receives downlink information from a base station, then delivers the downlink information to the processor 530 for processing, and sends related uplink data to the base station. Generally, the RF circuit includes, but is not limited to, an antenna, at least one amplifier, a transceiver, a coupler, a low noise amplifier (LNA), and a duplexer. In addition, the RF circuit 510 may also communicate with a network and another device by wireless communication. The wireless communication may use any communication standard or protocol, including, but not limited to, Global System for Mobile Communications (GSM), general packet radio service (GPRS), Code Division Multiple Access (CDMA), Wideband Code Division Multiple Access (WCDMA), Long Term Evolution (LTE), email, and short messaging service (SMS).

The memory 540 may be configured to store a software program and module. The processor 530 runs the software program and module stored in the memory 540, to implement various functional applications and data processing of the mobile phone 500. The memory 540 may mainly include a program storage area and a data storage area. The program storage area may store an operating system, an application program required by at least one function (such as a sound playback function and an image display function), and the like. The data storage area may store data (such as audio data and an address book) created according to use of the mobile phone 500, and the like. In addition, the memory 540 may include a high-speed random access memory, and may further include a non-volatile memory, such as at least one magnetic disk storage device, a flash memory, or other volatile solid-state storage devices.

The input unit 550 may be configured to: receive input digit or character information, and generate a key signal input related to a user setting and function control of the mobile phone 500. Specifically, the input unit 550 may include a touch panel 551 and another input device 552. The touch panel 551, also referred to as a touchscreen, may collect a touch operation of the user on or near the touch panel 551 (such as an operation of the user on or near the touch panel 551 by using any suitable object or accessory such as a finger or a stylus), and drive a corresponding connection apparatus based on a preset program. Optionally, the touch panel 551 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 530. Moreover, the touch controller can receive and execute a command sent from the processor 530. In addition, the touch panel 551 may be implemented into a plurality of types such as a resistive, capacitive, infrared, or surface acoustic wave type touch panel. In addition to the touch panel 551, the input unit 550 may further include the another input device 552. Specifically, the another input device 552 may include, but is not limited to, one or more of a physical keyboard, a functional key (such as a volume control key or a switch key), a trackball, a mouse, and a joystick.

The display unit 560 may be configured to display information entered by the user or information provided for the user, and various menus of the mobile phone 500. The display unit 560 may include a display panel 561. Optionally, the display panel 561 may be configured in a form of an LCD or OLED. Further, the touch panel 551 may cover the display panel 561. After detecting a touch operation on or near the touch panel 551, the touch panel 551 transfers the touch operation to the processor 530, so as to determine a type of a touch event. Then, the processor 530 provides a corresponding visual output on the display panel 561 based on the type of the touch event. Although, in FIG. 8, the touch panel 551 and the display panel 561 are used as two separate parts to implement input and output functions of the mobile phone 500, in some embodiments, the touch panel 551 and the display panel 561 may be integrated to implement the input and output functions of the mobile phone 500.

The mobile phone 500 may further include at least one sensor 570. For example, the sensor 570 may an optical sensor, a motion sensor, and another sensor. Specifically, the optical sensor may include an ambient light sensor and a proximity sensor. The ambient light sensor may adjust luminance of the display panel 561 depending on brightness of the ambient light. The proximity sensor may switch off the display panel 561 and/or backlight when the mobile phone 500 is moved to the ear. As one type of motion sensor, an acceleration sensor may detect magnitude of accelerations in various directions (generally on three axes), may detect magnitude and a direction of the gravity when static, and may be applied to a mobile phone posture recognition application (such as switching between horizontal and vertical screens, a related game, and magnetometer posture calibration), a function related to vibration recognition (such as a pedometer and a knock), and the like. Other sensors such as a gyroscope, a barometer, a hygrometer, a thermometer, and an infrared sensor, which may be configured in the mobile phone 500, are not further described herein.

The audio circuit 580, a speaker 581, and a microphone 582 may provide audio interfaces between the user and the mobile phone 500. The audio circuit 580 may convert received audio data into an electrical signal and transmit the electrical signal to the speaker 581. The speaker 581 converts the electrical signal into a sound signal for output. In addition, the microphone 582 converts a collected sound signal into an electrical signal. The audio circuit 580 receives the electrical signal, converts the electrical signal into audio data, and outputs the audio data to the RF circuit 510 to send the audio data to, for example, another mobile phone, or outputs the audio data to the memory 540 for further processing.

WiFi belongs to a short distance wireless transmission technology. The mobile phone 500 may help, by using the WiFi module 590, the user receive and send e-mails, browse a web page, access streaming media, and so on. WiFi provides wireless broadband Internet access for the user. Although FIG. 8 shows the WiFi module 590, it may be understood that the WiFi module 590 is not a necessary component of the mobile phone 500, and the WiFi module 590 may be omitted according to needs provided that the scope of the essence of the present disclosure is not changed.

The processor 530 is a control center of the mobile phone 500, and is connected to various parts of the entire mobile phone by using various interfaces and lines. By running or executing the software program and/or module stored in the memory 540, and invoking the data stored in the memory 540, the processor 530 performs various functions and data processing of the mobile phone 500, thereby implementing various services based on the mobile phone. Optionally, the processor 530 may include one or more processing units. Optionally, the processor 530 may integrate an application processor and a modem processor. The application processor mainly processes an operating system, a user interface, an application program, and the like. The modem processor mainly processes wireless communication. It may be understood that alternatively, the modem processor may not be integrated into the processor 530.

The mobile phone 500 further includes the power supply 520 (such as a battery) supplying power to the components. Preferably, the power supply may be logically connected to the processor 530 by using a power supply management system, so as to implement functions such as charging, discharging, and power consumption management by using the power supply management system.

Although not shown, the mobile phone 500 may further include a camera, a Bluetooth module, and the like, and details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A speech processing method, comprising:
   receiving, by a terminal, signals from a plurality of microphones, wherein the plurality of microphones includes a primary microphone and M secondary microphones, wherein M≥1, and M is an integer;
   performing, by the terminal, analog-to-digital conversion on the signals received from the plurality of microphones to obtain a plurality of time-domain digital signals, wherein a same sampling rate is used to perform the analog-to-digital conversion for each of the signals received from the plurality of microphones;
   performing, by the terminal, time-to-frequency-domain conversion on the plurality of time-domain digital signals to obtain a plurality of frequency-domain signals, wherein the plurality of frequency-domain signals includes a primary frequency-domain signal and M secondary frequency-domain signals, wherein the primary frequency-domain signal corresponds to the primary microphone, and the M secondary frequency-domain signals are in a one-to-one correspondence with the M secondary microphones, respectively; and
   determining, by the terminal, a signal type of the primary frequency-domain signal based on at least one of: a sound pressure difference between the primary frequency-domain signal and each of N secondary frequency-domain signals in the M secondary frequency-domain signals, a phase difference between the primary frequency-domain signal and each of the N secondary frequency-domain signals, and a frequency distribution characteristic of the primary frequency-domain signal, wherein 1≤N≤M, and N is an integer;

wherein determining the signal type of the primary frequency-domain signal comprises determining the primary frequency-domain signal as a whisper signal in response to determining that each of the following conditions is satisfied:

the sound pressure difference between the primary frequency-domain signal and each of the N secondary frequency-domain signals is greater than or equal to a corresponding seventh threshold, wherein each of the N secondary frequency-domain signals corresponds to one seventh threshold;

the phase difference between the primary frequency-domain signal and each of the N secondary frequency-domain signals is greater than or equal to a corresponding eighth threshold, wherein each of the N secondary frequency-domain signals corresponds to one eighth threshold; and the primary frequency-domain signal satisfies at least one of the following conditions: there is no fundamental frequency; a harmonic quantity is less than or equal to a fifth threshold; and a sub-band having maximum sub-band energy belongs to a first frequency band, and a difference between normalized energy of each of at least three sub-bands comprised in the primary frequency-domain signal and normalized energy of a corresponding sub-band in at least three sub-bands comprised in a predefined whisper signal is less than a corresponding sixth threshold, wherein the at least three sub-bands comprised in the primary frequency-domain signal are in a one-to-one correspondence with the at least three sub-bands comprised in the predefined whisper signal, each of the at least three sub-bands comprised in the primary frequency-domain signal corresponds to a corresponding sixth threshold, the normalized energy of each sub-band is a ratio of energy of the sub-band to total energy of the at least three sub-bands, and the energy of the sub-band is a sum of energy of frequency ranges in the sub-band.

2. The method according to claim 1, wherein in response to determining that the primary frequency-domain signal is a whisper signal, the method further comprises:

calculating an estimated noise based on performing at least one of: stationary noise estimation, background human noise estimation, and burst noise estimation on the primary frequency-domain signal; and performing noise reduction processing on the estimated noise.

3. The method according to claim 2, wherein the performing background human noise estimation on the primary frequency-domain signal comprises:

performing background human noise estimation on the primary frequency-domain signal by using an adaptive beamformer whose beam width is a first width, wherein the first width is less than a preset beam width.

4. The method according to claim 3, wherein the performing burst noise estimation on the primary frequency-domain signal comprises:

collecting statistics about a change speed of the primary frequency-domain signal in a first time window by using the first time window whose time window length is less than a preset length;

in response to determining that the change speed of the primary frequency-domain signal is greater than a preset speed threshold, determining whether normalized energy of each sub-band of the primary frequency-domain signal in the first time window is greater than or equal to a corresponding ninth threshold, and whether normalized energy of all sub-bands of the primary frequency-domain signal in the first time window is diminished in ascending order of frequencies, wherein the primary frequency-domain signal in the first time window comprises at least one sub-band, the normalized energy of each sub-band is a ratio of energy of the sub-band to total energy of the at least one sub-band, and the energy of the sub-band is a sum of energy of frequency ranges in the sub-band; and determining the signal in the first time window as burst noise in response to determining that the normalized energy of each sub-band of the primary frequency-domain signal in the first time window is greater than or equal to the corresponding ninth threshold and the normalized energy of all the sub-bands of the primary frequency-domain signal in the first time window is diminished in ascending order of frequencies.

5. The method according to claim 3, wherein the method further comprises:

performing gain control on a signal obtained after the noise reduction, to obtain a gain-adjusted signal.

6. The method according to claim 5, wherein in response to determining that gain control is performed on the signal obtained after the noise reduction, at least one of the following conditions is satisfied:

a gain lower limit is a target lower limit, a gain upper limit is a target upper limit, a maximum level value of the signal obtained after the noise reduction is a target level value, and a gain smoothing speed is a target speed, wherein the target lower limit is greater than a preset lower limit, the target upper limit is less than a preset upper limit, the target level value is less than a preset level value, and the target speed is less than a preset speed.

7. The method according to claim 5, wherein the method further comprises:

performing frequency response control on the gain-adjusted signal, to obtain a frequency-response-adjusted signal.

8. The method according to claim 7, wherein the performing frequency response control on the gain-adjusted signal comprises:

performing frequency response control on a first frequency band of the gain-adjusted signal by using a first target frequency response, performing frequency response control on a second frequency band of the gain-adjusted signal by using a second target frequency response, and performing frequency response control on a third frequency band of the gain-adjusted signal by using a third target frequency response, wherein the first target frequency response is greater than or equal to a first preset frequency response, the second target frequency response is greater than a second preset frequency response, the third target frequency response is less than a third preset frequency response, and a minimum frequency in the first frequency band is greater than or equal to a maximum frequency in the second frequency band and is less than or equal to a minimum frequency in the third frequency band.

9. A terminal, comprising:
a receiver, configured to receive signals from a plurality of microphones, wherein the plurality of microphones includes a primary microphone and M secondary microphones, wherein M≥1, and M is an integer; and
a processor configured to:
perform analog-to-digital conversion on the plurality of signals received from the plurality of microphones to obtain a plurality of time-domain digital signals, wherein a same sampling rate is used to perform the analog-to-digital conversion for each of the signals received from the plurality of microphones;
perform time-to-frequency-domain conversion on the plurality of time-domain digital signals to obtain a plurality of frequency-domain signals, wherein the plurality of frequency-domain signals includes a primary frequency-domain signal and M secondary frequency-domain signals, wherein the primary frequency-domain signal corresponds to the primary microphone, and the M secondary frequency-domain signals are in a one-to-one correspondence with the M secondary microphones, respectively; and
determine a signal type of the primary frequency-domain signal based on at least one of a sound pressure difference between the primary frequency-domain signal and each of N secondary frequency-domain signals in the M secondary frequency-domain signals, a phase difference between the primary frequency-domain signal and each of the N secondary frequency-domain signals, and a frequency distribution characteristic of the primary frequency-domain signal, wherein 1≤N≤M, and N is an integer;
wherein determining the signal type of the primary frequency-domain signal comprises determining the primary frequency-domain signal as a whisper signal in response to determining that each of the following conditions is satisfied:
the sound pressure difference between the primary frequency-domain signal and each of the N secondary frequency-domain signals is greater than or equal to a corresponding seventh threshold, wherein each of the N secondary frequency-domain signals corresponds to one seventh threshold;
the phase difference between the primary frequency-domain signal and each of the N secondary frequency-domain signals is greater than or equal to a corresponding eighth threshold, wherein each of the N secondary frequency-domain signals corresponds to one eighth threshold; and
the primary frequency-domain signal satisfies at least one of the following conditions: there is no fundamental frequency; a harmonic quantity is less than or equal to a fifth threshold; and a sub-band having maximum sub-band energy belongs to a first frequency band, and a difference between normalized energy of each of at least three sub-bands comprised in the primary frequency-domain signal and normalized energy of a corresponding sub-band in at least three sub-bands comprised in a predefined whisper signal is less than a corresponding sixth threshold, wherein the at least three sub-bands comprised in the primary frequency-domain signal are in a one-to-one correspondence with the at least three sub-bands comprised in the predefined whisper signal, each of the at least three sub-bands comprised in the primary frequency-domain signal corresponds to a corresponding sixth threshold, the normalized energy of each sub-band is a ratio of energy of the sub-band to total energy of the at least three sub-bands, and the energy of the sub-band is a sum of energy of frequency ranges in the sub-band.

10. The terminal according to claim 9, wherein the processor is further configured to:
calculate an estimated noise based on performing at least one of stationary noise estimation, background human noise estimation, and burst noise estimation on the primary frequency-domain signal; and
perform noise reduction processing on the estimated noise.

11. The terminal according to claim 10, wherein the processor is further configured to:
perform background human noise estimation on the primary frequency-domain signal by using an adaptive beamformer whose beam width is a first width, wherein the first width is less than a preset beam width.

12. The terminal according to claim 11, wherein the processor is further configured to:
collect statistics about a change speed of the primary frequency-domain signal in a first time window by using the first time window whose time window length is less than a preset length;
in response to determining that the change speed of the signal is greater than a preset speed threshold, determine whether normalized energy of each sub-band of the primary frequency-domain signal in the first time window is greater than or equal to a corresponding ninth threshold, and whether normalized energy of all sub-bands of the primary frequency-domain signal in the first time window is diminished in ascending order of frequencies, wherein the primary frequency-domain signal in the first time window comprises at least one sub-band, the normalized energy of each sub-band is a ratio of energy of the sub-band to total energy of the at least one sub-band, and the energy of the sub-band is a sum of energy of frequency ranges in the sub-band; and
determine the signal in the first time window as burst noise in response to determining that the normalized energy of each sub-band of the primary frequency-domain signal in the first time window is greater than or equal to the corresponding ninth threshold and the normalized energy of all the sub-bands of the primary frequency-domain signal in the first time window is diminished in ascending order of frequencies.

13. The terminal according to claim 11, wherein the processor is further configured to:
perform gain control on a signal obtained after the noise reduction, to obtain a gain-adjusted signal.

14. The terminal according to claim 13, wherein in response to determining that gain control is performed on the signal obtained after the noise reduction, at least one of the following conditions is satisfied:
a gain lower limit is a target lower limit, a gain upper limit is a target upper limit, a maximum level value of the signal obtained after the noise reduction is a target level value, and a gain smoothing speed is a target speed,
wherein the target lower limit is greater than a preset lower limit, the target upper limit is less than a preset upper limit, the target level value is less than a preset level value, and the target speed is less than a preset speed.

15. The terminal according to claim 13, wherein the processor is further configured to:
perform frequency response control on the gain-adjusted signal, to obtain a frequency-response-adjusted signal.

16. The terminal according to claim 15, wherein the processor is further configured to:
perform frequency response control on a first frequency band of the gain-adjusted signal by using a first target frequency response,
perform frequency response control on a second frequency band of the gain-adjusted signal by using a second target frequency response, and
perform frequency response control on a third frequency band of the gain-adjusted signal by using a third target frequency response,
wherein the first target frequency response is greater than or equal to a first preset frequency response, the second target frequency response is greater than a second preset frequency response, the third target frequency response is less than a third preset frequency response, and a minimum frequency in the first frequency band is greater than or equal to a maximum frequency in the second frequency band and is less than or equal to a minimum frequency in the third frequency band.

17. A non-transitory computer-readable storage medium storing instructions that, when executed, cause a terminal to perform the steps of:
receiving signals from a plurality of microphones, wherein the plurality of microphones includes a primary microphone and M secondary microphones, wherein M≥1, and M is an integer;
performing analog-to-digital conversion on the plurality of signals received from the plurality of microphones to obtain a plurality of time-domain digital signals, wherein a same sampling rate is used to perform the analog-to-digital conversion for each of the signals received from the plurality of microphones;
performing time-to-frequency-domain conversion on the plurality of time-domain digital signals to obtain a plurality of frequency-domain signals, wherein the plurality of frequency-domain signals includes a primary frequency-domain signal and M secondary frequency-domain signals, wherein the primary frequency-domain signal corresponds to the primary microphone, and the M secondary frequency-domain signals are in a one-to-one correspondence with the M secondary microphones, respectively; and
determining a signal type of the primary frequency-domain signal based on: a sound pressure difference between the primary frequency-domain signal and each of N secondary frequency-domain signals in the M secondary frequency-domain signals and a frequency distribution characteristic of the primary frequency-domain signal, wherein 1≤N≤M, and N is an integer;
wherein determining the signal type of the primary frequency-domain signal comprises determining the primary frequency-domain signal as a whisper signal in response to determining that each of the following conditions is satisfied:
the sound pressure difference between the primary frequency-domain signal and each of the N secondary frequency-domain signals is greater than or equal to a corresponding seventh threshold, wherein each of the N secondary frequency-domain signals corresponds to one seventh threshold;
the phase difference between the primary frequency-domain signal and each of the N secondary frequency-domain signals is greater than or equal to a corresponding eighth threshold, wherein each of the N secondary frequency-domain signals corresponds to one eighth threshold; and
the primary frequency-domain signal satisfies at least one of the following conditions: there is no fundamental frequency; a harmonic quantity is less than or equal to a fifth threshold; and a sub-band having maximum sub-band energy belongs to a first frequency band, and a difference between normalized energy of each of at least three sub-bands comprised in the primary frequency-domain signal and normalized energy of a corresponding sub-band in at least three sub-bands comprised in a predefined whisper signal is less than a corresponding sixth threshold,
wherein the at least three sub-bands comprised in the primary frequency-domain signal are in a one-to-one correspondence with the at least three sub-bands comprised in the predefined whisper signal, each of the at least three sub-bands comprised in the primary frequency-domain signal corresponds to a corresponding sixth threshold, the normalized energy of each sub-band is a ratio of energy of the sub-band to total energy of the at least three sub-bands, and the energy of the sub-band is a sum of energy of frequency ranges in the sub-band.

18. The computer-readable storage medium according to claim 17, wherein in response to determining that the primary frequency-domain signal is a whisper signal, executing the instructions further causes the terminal to perform the steps of:
calculating an estimated noise based on performing at least one of: stationary noise estimation, background human noise estimation, and burst noise estimation on the primary frequency-domain signal; and
performing noise reduction processing on the estimated noise.

19. The computer-readable storage medium according to claim 18, wherein calculating the estimated noise comprises:
performing background human noise estimation on the primary frequency-domain signal by using an adaptive beamformer whose beam width is a first width, wherein the first width is less than a preset beam width.

20. The computer-readable storage medium according to claim 19, wherein calculating the estimated noise comprises:
collecting statistics about a change speed of the primary frequency-domain signal in a first time window by using the first time window whose time window length is less than a preset length;
in response to determining that the change speed of the signal is greater than a preset speed threshold, determining whether normalized energy of each sub-band of the primary frequency-domain signal in the first time window is greater than or equal to a corresponding ninth threshold, and whether normalized energy of all sub-bands of the primary frequency-domain signal in the first time window is diminished in ascending order of frequencies, wherein the primary frequency-domain signal in the first time window comprises at least one sub-band, the normalized energy of each sub-band is a ratio of energy of the sub-band to total energy of the at least one sub-band, and the energy of the sub-band is a sum of energy of frequency ranges in the sub-band; and
determining the signal in the first time window as burst noise in response to determining that the normalized energy of each sub-band of the primary frequency-domain signal in the first time window is greater than or equal to the corresponding ninth threshold and the normalized energy of all the sub-bands of the primary frequency-domain signal in the first time window is diminished in ascending order of frequencies.

21. The computer-readable storage medium according to claim 19, wherein executing the instructions further causes the terminal to perform the steps of:
performing gain control on a signal obtained after the noise reduction, to obtain a gain-adjusted signal.

22. The computer-readable storage medium according to claim 21, wherein in response to determining that gain control is performed on the signal obtained after the noise reduction, at least one of the following conditions is satisfied:
a gain lower limit is a target lower limit, a gain upper limit is a target upper limit, a maximum level value of the signal obtained after the noise reduction is a target level value, and a gain smoothing speed is a target speed,
wherein the target lower limit is greater than a preset lower limit, the target upper limit is less than a preset upper limit, the target level value is less than a preset level value, and the target speed is less than a preset speed.

23. The computer-readable storage medium according to claim 21, wherein executing the instructions further causes the terminal to perform the steps of:
performing frequency response control on the gain-adjusted signal, to obtain a frequency-response-adjusted signal.

24. The computer-readable storage medium according to claim 23, wherein performing frequency response control comprises:
performing frequency response control on a first frequency band of the gain-adjusted signal by using a first target frequency response,
performing frequency response control on a second frequency band of the gain-adjusted signal by using a second target frequency response, and
performing frequency response control on a third frequency band of the gain-adjusted signal by using a third target frequency response,
wherein the first target frequency response is greater than or equal to a first preset frequency response, the second target frequency response is greater than a second preset frequency response, the third target frequency response is less than a third preset frequency response, and a minimum frequency in the first frequency band is greater than or equal to a maximum frequency in the second frequency band and is less than or equal to a minimum frequency in the third frequency band.

* * * * *